US012229795B2

(12) United States Patent
Kalwani et al.

(10) Patent No.: US 12,229,795 B2
(45) Date of Patent: Feb. 18, 2025

(54) SYSTEM AND METHOD FOR GENERATING LOCATION BASED MULTIPLIER NOTIFICATIONS

(71) Applicant: The Toronto-Dominion Bank, Toronto (CA)

(72) Inventors: Neha Dipna Kalwani, Toronto (CA); Jeffrey MacDonald, Ottawa (CA); David Reilly, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 159 days.

(21) Appl. No.: 17/157,305

(22) Filed: Jan. 25, 2021

(65) Prior Publication Data

US 2022/0237648 A1 Jul. 28, 2022

(51) Int. Cl.
*G06Q 30/02* (2023.01)
*G06Q 30/0207* (2023.01)
*G06Q 30/0226* (2023.01)
*G06Q 30/0251* (2023.01)
*H04W 4/021* (2018.01)

(52) U.S. Cl.
CPC ..... *G06Q 30/0232* (2013.01); *G06Q 30/0224* (2013.01); *G06Q 30/0233* (2013.01); *G06Q 30/0261* (2013.01); *H04W 4/021* (2013.01); *G06Q 30/0213* (2013.01)

(58) Field of Classification Search
None
See application file for complete search history.

(56) References Cited

U.S. PATENT DOCUMENTS

| | | | |
|---|---|---|---|
| 8,458,016 B1 | 6/2013 | Medina, III et al. | |
| 11,315,179 B1* | 4/2022 | Rehder | G06F 18/2113 |
| 11,423,395 B1* | 8/2022 | Kurani | G06Q 20/3676 |
| 2004/0193489 A1* | 9/2004 | Boyd | G06Q 30/0241 |
| | | | 705/14.27 |

(Continued)

FOREIGN PATENT DOCUMENTS

| | | |
|---|---|---|
| WO | 2019195263 | 10/2019 |
| WO | 2020072312 | 4/2020 |

OTHER PUBLICATIONS

JPMorgan Chase & Co.; Title: You're a Click Away From 5% Cash Back; https://www.chasebonus.com/; 2021.

(Continued)

*Primary Examiner* — Mathew Syrowik
(74) *Attorney, Agent, or Firm* — Rowand LLP

(57) ABSTRACT

A computer server system comprises a communications module; a processor coupled with the communications module; and a memory coupled to the processor and storing processor-executable instructions which, when executed by the processor, configure the processor to receive, via the communications module and from a computing device, a signal including location data indicating a location of a user; determine, based on the location data, that the user is located within a threshold distance of a particular merchant; generate a notification indicating a particular multiplier for the particular merchant; and send, via the communications module and to the computing device, a signal causing the computing device to display the notification, the notification including an option to accept the particular multiplier for the particular merchant.

20 Claims, 22 Drawing Sheets

(56) References Cited

U.S. PATENT DOCUMENTS

| | | | |
|---|---|---|---|
| 2009/0150218 A1* | 6/2009 | Brunner | G06Q 30/0261 |
| | | | 705/14.58 |
| 2012/0150611 A1* | 6/2012 | Isaacson | G06Q 30/0239 |
| | | | 705/14.27 |
| 2012/0254038 A1* | 10/2012 | Mullen | G07F 7/0806 |
| | | | 705/44 |
| 2012/0271705 A1* | 10/2012 | Postrel | G06Q 30/02 |
| | | | 705/14.33 |
| 2015/0149272 A1* | 5/2015 | Salmon | G07F 17/0035 |
| | | | 705/14.33 |
| 2015/0186918 A1 | 7/2015 | Clarke | |
| 2015/0332305 A1 | 11/2015 | Kodali | |
| 2017/0286989 A1 | 10/2017 | Zigoris et al. | |
| 2017/0316417 A1* | 11/2017 | Wang | G06Q 20/12 |
| 2018/0165704 A1* | 6/2018 | Mullen | G06Q 30/0233 |
| 2018/0268401 A1 | 9/2018 | Ortiz et al. | |
| 2019/0050887 A1* | 2/2019 | Nelsen | G06Q 30/0201 |
| 2019/0197575 A1* | 6/2019 | Ladds | G06Q 30/0226 |
| 2020/0051111 A1* | 2/2020 | Nelsen | G06Q 30/0216 |
| 2020/0051112 A1 | 2/2020 | Nelsen et al. | |
| 2020/0134654 A1* | 4/2020 | Postrel | G06Q 20/32 |
| 2020/0265474 A1* | 8/2020 | Brown | G06Q 30/0267 |
| 2021/0224800 A1* | 7/2021 | Bloy | G07F 17/0035 |

OTHER PUBLICATIONS

Cash+ US Bank; Title: Sign in to activate your Cash+TM Categories for Oct.-Dec. 2020; https://cashplus.usbank.com/; Nov. 6, 2020.

* cited by examiner

SYSTEM AND METHOD FOR GENERATING LOCATION BASED MULTIPLIER NOTIFICATIONS

TECHNICAL FIELD

The present application relates to systems and methods for generating location based multiplier recommendations.

BACKGROUND

Data records may be eligible for multipliers. For example, a data record may be associated with a particular category or a particular merchant and thus may be eligible for a multiplier.

The particular categories or particular merchants eligible for multipliers are often defined by an issuer. The particular categories or particular merchants defined by the issuer may not be categories that a user is interested in receiving multipliers for.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
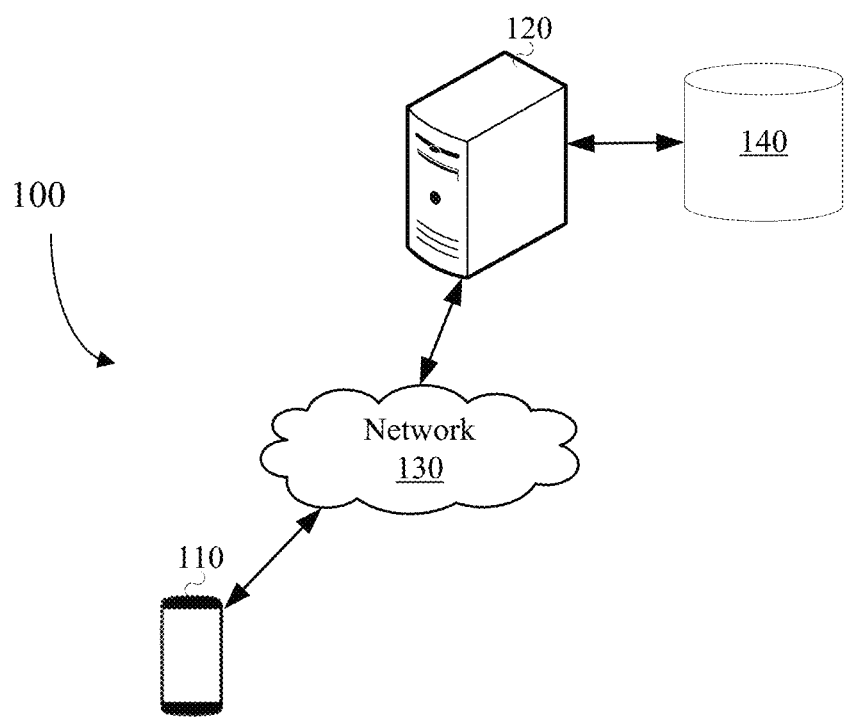
FIG. 1 is a schematic operation diagram illustrating an operating environment of an example embodiment.

Accordingly, in one aspect there is provided a computer server system comprising a communications module; a processor coupled with the communications module; and a memory coupled to the processor and storing processor-executable instructions which, when executed by the processor, configure the processor to receive, via the communications module and from a computing device, a signal including location data indicating a location of a user; determine, based on the location data, that the user is located within a threshold distance of a particular merchant; generate a notification indicating a particular multiplier for the particular merchant; and send, via the communications module and to the computing device, a signal causing the computing device to display the notification, the notification including an option to accept the particular multiplier for the particular merchant.

In one or more embodiments, the processor-executable instructions, when executed by the processor, further configure the processor to prior to generating the notification, determining, based on the location data, that the user has been located within the threshold distance of the particular merchant a predefined number of times within a time period.

In one or more embodiments, the processor-executable instructions, when executed by the processor, further configure the processor to identify a category associated with the particular merchant; and prior to generating the notification, determining, based on the location data, that the user has been located within the threshold distance of one or more merchants associated with the identified category a predefined number of times within a time period, the notification indicating the particular multiplier for the identified category.

In one or more embodiments, the notification indicating the particular multiplier for the particular merchant includes an option to adjust the particular multiplier for the particular merchant.

In one or more embodiments, the notification indicating the particular multiplier for the particular merchant includes an option to adjust a time period for the particular multiplier for the particular merchant.

In one or more embodiments, the processor-executable instructions, when executed by the processor, further configure the processor to identify a category associated with the particular merchant, the notification indicating the particular multiplier for the particular merchant including an option to accept the identified category for the particular multiplier.

In one or more embodiments, the processor-executable instructions, when executed by the processor, further configure the processor to receive, via the communications module and from the computing device, a signal indicating selection of the selectable option to accept the particular multiplier for the particular merchant; analyze data records associated with an account of the user to identify one or more data records associated with the particular merchant; assign a value to the identified one or more data records; and update a value account of the user based on the assigned values.

In one or more embodiments, the processor-executable instructions, when executed by the processor, further configure the processor to receive, via the communications module and from the computing device, a signal indicating selection of the selectable option to accept the particular multiplier for the particular merchant; and responsive to receiving the signal indicating selection of the selectable option to accept the particular multiplier for the particular merchant, apply an input/output modifier to an account of the particular merchant.

In one or more embodiments, the notification includes a selectable option to select the particular merchant as a tenant merchant for a particular category, and the processor-executable instructions, when executed by the processor, further configure the processor to receive, via the communications module and from the computing device, a signal indicating selection of the selectable option to select the particular merchant as the tenant merchant for the particular category; analyze data records associated with an account of the user to identify one or more data records associated with the particular category; assign a value to data records associated with the tenant merchant based on the particular multiplier and assign a zero value to data records associated with the particular category that are not associated with the tenant merchant; and update a value account of the user based on the assigned values.

In one or more embodiments the processor-executable instructions, when executed by the processor, further configure the processor to receive, via the communications module and from the computing device, a signal indicating selection of the selectable option to accept the particular multiplier for the particular merchant; and provide, via the communications module and to the computing device, a signal including an interface, the interface including information identifying the particular merchant and the particular multiplier for the particular merchant, the interface including and one or more additional categories selectable by the user, each additional category associated with a particular multiplier.

According to another aspect there is provided a computer-implemented method comprising receiving, via a communications module and from a computing device, a signal including location data indicating a location of a user; determining, based on the location data, that the user is located within a threshold distance of a particular merchant; generating a notification indicating a particular multiplier for the particular merchant; and sending, via the communications module and to the computing device, a signal causing the computing device to display the notification, the notification including an option to accept the particular multiplier for the particular merchant.

In one or more embodiments, the method further comprises prior to generating the notification, determining, based on the location data, that the user has been located within the threshold distance of the particular merchant a predefined number of times within a time period.

In one or more embodiments, the method further comprises identifying a category associated with the particular merchant; and prior to generating the notification, determining, based on the location data, that the user has been located within the threshold distance of one or more merchants associated with the identified category a predefined number of times within a time period, the notification indicating the particular multiplier for the identified category.

In one or more embodiments, the notification indicating the particular multiplier for the particular merchant includes an option to adjust the particular multiplier for the particular merchant.

In one or more embodiments, the notification indicating the particular multiplier for the particular merchant includes an option to adjust a time period for the particular multiplier for the particular merchant.

In one or more embodiments, the method further comprises identify a category associated with the particular merchant, the notification indicating the particular multiplier for the particular merchant including an option to accept the identified category for the particular multiplier.

In one or more embodiments, the method further comprises receiving, via the communications module and from the computing device, a signal indicating selection of the selectable option to accept the particular multiplier for the particular merchant; analyzing data records associated with an account of the user to identify one or more data records associated with the particular merchant; assigning a value to the identified one or more data records; and updating a value account of the user based on the assigned values.

In one or more embodiments, the method further comprises receiving, via the communications module and from the computing device, a signal indicating selection of the selectable option to accept the particular multiplier for the particular merchant; and responsive to receiving the signal indicating selection of the selectable option to accept the particular multiplier for the particular merchant, applying an input/output modifier to an account of the particular merchant.

In one or more embodiments, the notification includes a selectable option to select the particular merchant as a tenant merchant for a particular category, and the method further comprises receiving, via the communications module and from the computing device, a signal indicating selection of the selectable option to select the particular merchant as the tenant merchant for the particular category; analyzing data records associated with an account of the user to identify one or more data records associated with the particular category; assigning a value to data records associated with the tenant merchant based on the particular multiplier and assign a zero value to data records associated with the particular category that are not associated with the tenant merchant; and updating a value account of the user based on the assigned values.

According to another aspect there is provided a non-transitory computer readable storage medium comprising computer-executable instructions which, when executed, configure a processor to receive, via a communications module and from a computing device, a signal including location data indicating a location of a user; determine, based on the location data, that the user is located within a threshold distance of a particular merchant; generate a notification indicating a particular multiplier for the particular merchant; and send, via the communications module and to the computing device, a signal causing the computing device to display the notification, the notification including an option to accept the particular multiplier for the particular merchant.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment. As shown, the system 100 includes a computing device 110 and a server 120 coupled to one another through a network 130, which may include a public network such as the Internet and/or a private network. The computing device 110 and the server 120 may be in geographically disparate locations. Put differently, the computing device 110 and the server 120 may be located remote from one another.

The server 120 may be associated with a financial institution, a value card provider such as for example a credit card provider, and/or a loyalty points provider.

The server 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The computing device 110 may be a smartphone as shown in FIG. 1. However, the computing device 110 may be a computing device of another type such as for example a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The computing device 110 is adapted to present a graphical user interface that allows for communication with the server 120. For example, the computing device 110 may be adapted to receive, from the server 120, a signal that causes the computing device 110 to display an interface of a loyalty point management application.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The server 120 may be associated with or may communicate with a database 140 that stores data records. The data records may be associated with user or customer accounts and may include value account data and/or transaction data records listing transactions made on a value card of a user. The user or customer accounts may be identified with an account number. The value account data may include loyalty point data which may include a loyalty points balance available to the user associated therewith. The loyalty point data may be related to the transaction data records. For example, the loyalty point data may be based on or related to transactions made by the user on a particular value card. The transaction data records may include an amount of the transaction, an identifier of the merchant where the transaction was made, and/or may include a label indicating a category associated with the identified merchant. The category may be determined using, for example, a lookup table listing merchants and associated categories. Other methods of associating a category with a merchant may also be used. The database 140 may also store data records that include data identifying the user such as for example a personal name, geographic address, a telephone number, a date of birth, etc.

The database 140 may store conversion rate data records for a user. The conversion rate data records include information identifying merchants and/or categories for which loyalty points can be earned and an associated conversion rate for each particular merchant and/or category. Example categories include travel, hotel, e-commerce, fast food, gas, groceries, entertainment, ride sharing, food delivery, health and wellness, beauty and cosmetics, telecom, home improvement, coffee shops, clothing, etc.

The conversion rate may be a conversion rate of an amount spent to loyalty points earned. The conversion rate may be referred to as a multiplier. As an example, a multiplier of "1.5×" indicates that for every one dollar ($1.00) spent, one-point-five (1.5) loyalty points are earned. As another example, a multiplier of "5×" indicates that for every one dollar ($1.00) spent, five (5) loyalty points are earned.

The multiplier may be specific to a particular category or a particular merchant. Only some categories or merchants may be eligible for multipliers and as such a default multiplier of "1×" may be assigned to categories or merchants not eligible for multipliers.

The conversion rate data records are associated with a particular user. As will be described in more detail below, a loyalty point management application associated with the server 120 may enable the particular user to update or modify the conversion rate data records.

The server 120 may communicate with the database 140 directly or through the network 130. It will be appreciated that although the database 140 is shown as being associated with the server 120, in another embodiment the database 140 may be separate from the server 120 and may be associated with, for example, a third-party server. Further, the server 120 may be associated with multiple databases.

Figure 2:
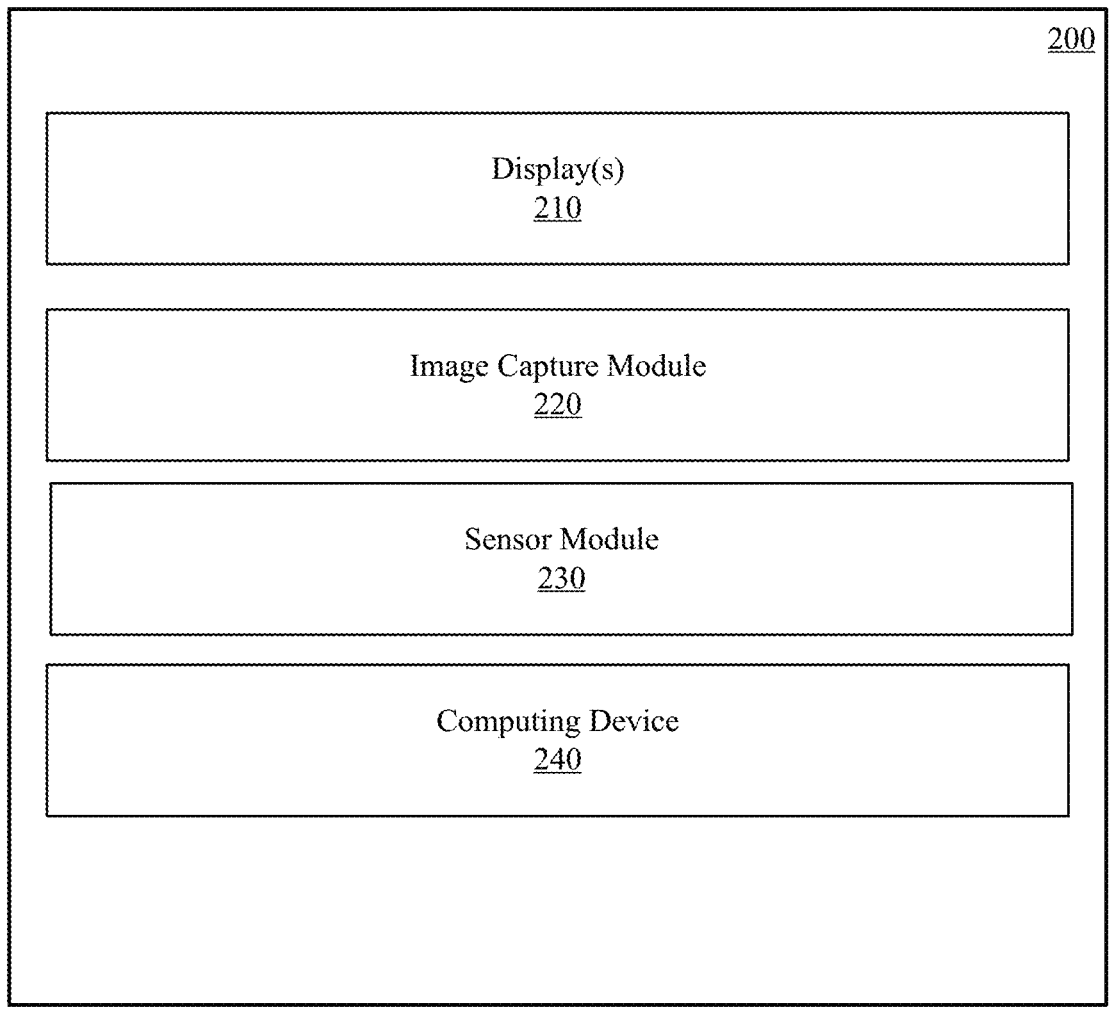
FIG. 2 is a simplified schematic diagram showing components of a computing device.

FIG. 2 is a simplified schematic diagram showing component of an exemplary computing device 200. The computing device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
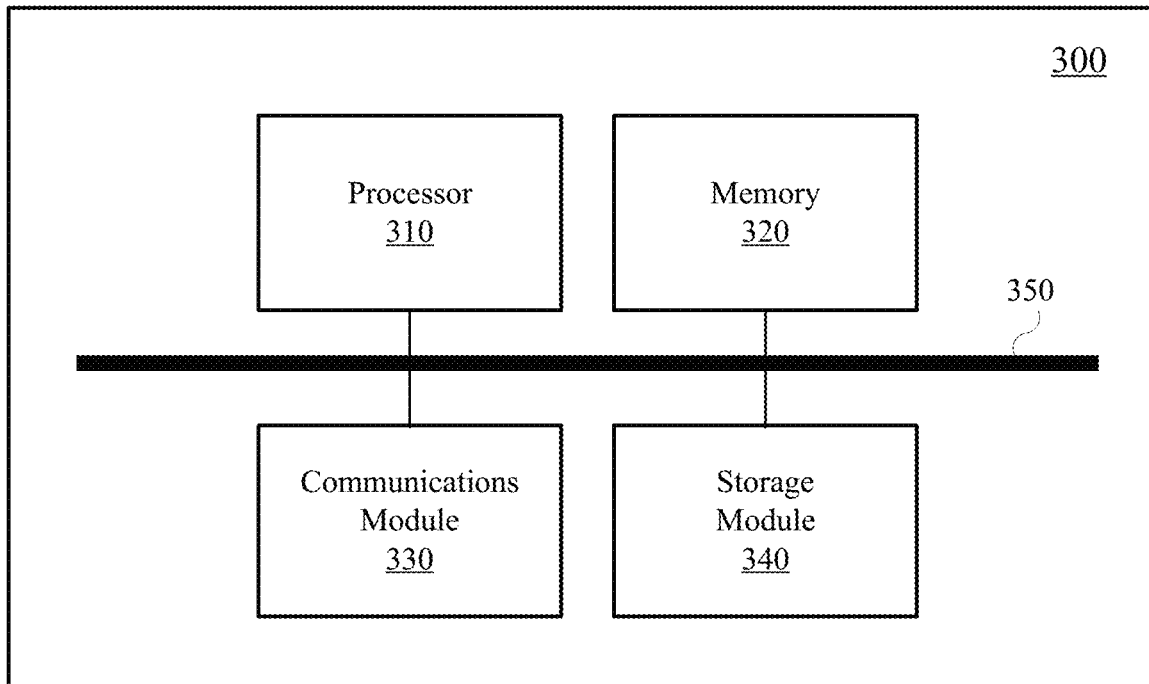
FIG. 3 is a high-level schematic diagram of an example computing device.

Referring now to FIG. 3, a high-level operation diagram of an example computer device 300 is shown. In some embodiments, the computer device 300 may be exemplary of the computer device 240 (FIG. 2) and/or server 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
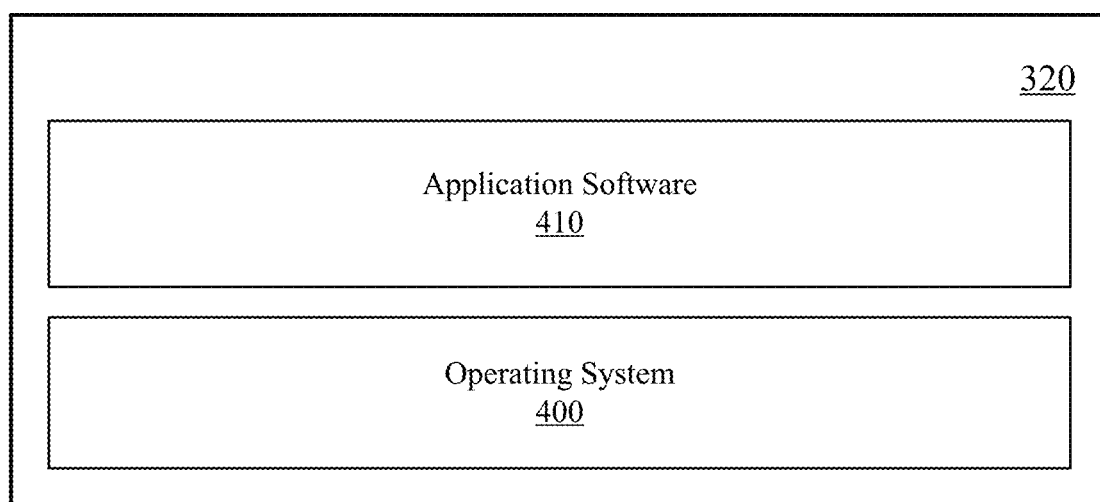
FIG. 4 shows a simplified organization of software components stored in a memory of the example computing device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server 120.

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include a loyalty point management application.

The loyalty point management application may be configured to provide various loyalty point management functions. The loyalty point management functions may include adjusting, updating or modifying the conversion rate data records associated with a user's account. For example, the loyalty point management application may provide one or more graphical user interfaces configured to allow a user to select categories and/or merchants for multipliers. As another example, the loyalty point management application may provide one or more graphical user interfaces configured to allow a user to adjust the particular multiplier for selected categories and/or merchants.

The loyalty point management application may also provide one or more graphical user interfaces configured to display one or more offers for multipliers. The one or more offers may be generated in response to agreements made with one or more partner merchants. For example, a particular merchant may wish to offer certain users or customers a particular multiplier and as such offers may be provided to the certain users or customers through the loyalty point management application.

Figure 5:
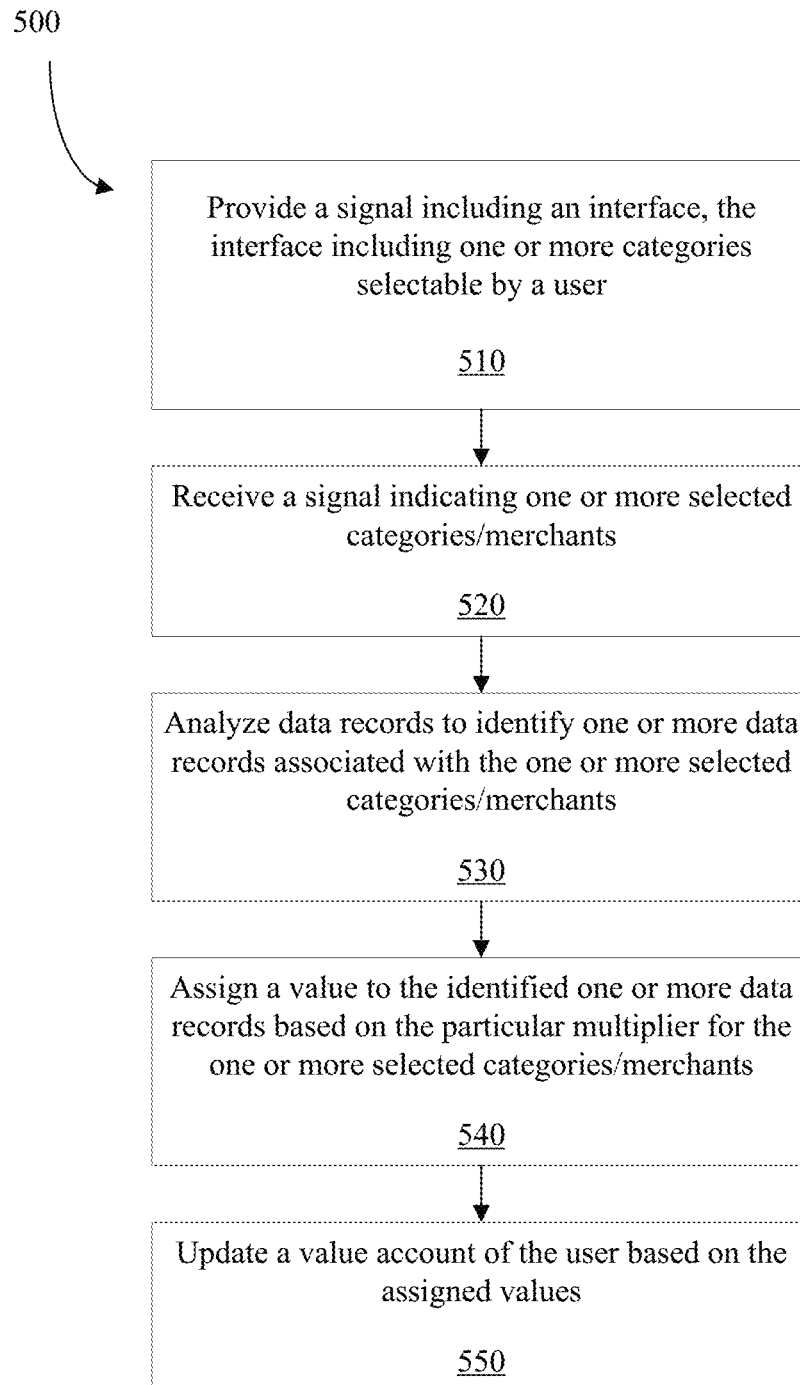
FIG. 5 is a flowchart showing operations performed by a server in providing an interface according to an embodiment.

The server 120 may be configured to provide the one or more graphical user interfaces of the loyalty point management application to the computing device 110 and may adjust, update or modify the conversion rate data records associated with a user's account based on user interaction with the one or more graphical user interfaces. FIG. 5 is a flowchart showing operations performed by the server 120 according to an embodiment. The operations may be included in a method 500 which may be performed by the server 120. For example, computer-executable instructions stored in memory of the server 120 may, when executed by one or more processors, configure the server 120 to perform the method 500 or a portion thereof.

The server 120 provides, via the communications module and to the computing device 110, a signal including an interface, the interface including one or more categories selectable by a user (step 510). The one or more categories may be selected by the user using, for example, a touch gesture on a display screen of the computing device 110.

In this embodiment, the categories selected by the user are categories that the user is interested in receiving point multiplier for. Specifically, within the interface, the user may select one or more categories eligible for multipliers. For example, the user may select "fast food" as a category eligible for a multiplier of "2×" and as such any dollar spent at a merchant associated with "fast food" earns the user two (2) loyalty points. Similarly, the user may de-select one or more categories as being eligible for multipliers. The user may only be permitted to select or de-select categories a predefined number of times within a time period. For example, the user may only be permitted to select or de-select categories once a month.

Some categories cannot be de-selected by the user. Put another way, within the conversion rate data records maintained by the database 140, one or more categories may be labelled or defined as an anchor category. An anchor category is a category that cannot be de-selected by the user.

For example, "Groceries" may be an anchor category and may be associated with a particular multiplier. Within the interface, the user cannot de-select or remove "Groceries" as a category eligible for a multiplier.

The interface may include an option to select a tenant merchant for a particular category. Put another way, within the conversion rate data records maintained by the database 140, one or more merchants may be defined or labelled as a tenant merchant for a particular category. A tenant merchant may be the only merchant eligible for multipliers within a particular category. For example, a merchant named "Local Brew" may be a tenant merchant for the category of "Coffee Shops". As such, only purchases made at "Local Brew" may be eligible for multipliers and any other purchases made at a "Coffee Shop" merchant that is not named "Local Brew" is not eligible for multipliers. The user may select one or more merchants as a tenant merchant for a particular category within the interface.

The interface may include an option to adjust the multiplier for one or more selected categories and/or merchants. Put another way, the user may update the conversion rate data records maintained by the database 140 to increase or decrease the multiplier for a particular category or a particular merchant. For example, the user may select "Food Delivery" as a category eligible for a point multiplier of "2×". The user may wish to increase the multiplier to "3×" and this may be done via user interaction with the interface. In this manner, the conversion rate data records may be updated via user interaction with the interface.

An input/output modifier may be applied to the user's account based on the number of categories selected by the user and/or based on the multiplier selected by the user. The input/output modifier may be a monthly fee or an annual fee. For example, a fee may be applied when a number of selected categories exceeds a threshold number. In this example, the threshold number of categories may be three categories. Within the loyalty point management application, the user may select up to three categories for no fee. Responsive to the user selecting a fourth category, a fee may be required and this fee may be applied to the account of the user.

As another example, a fee may be applied when a selected multiplier exceeds a baseline multiplier. In this example, a baseline multiplier may be set as "3×". Within the loyalty point management application, the user may select a multiplier of "5×" and as such a fee may be applied to the account of the user.

The input/output modifier may alternatively be applied to an account of a merchant. For example, a merchant may wish to provide an offer to a user and, when accepted by the user, the input/output modifier may be applied to the account of the merchant.

Responsive to the user selecting one or more categories and/or merchants, the server 120 receives, via the communications module and from the computing device 110, a signal indicating one or more selected categories (step 520). In this embodiment, the signal identifies which categories and/or merchants have been selected by the user and includes the particular multiplier selected by the user. The server 120 sends a signal to the database 140 to update the conversion rate data records maintained thereby to update or add the selected category and/or merchant with the particular multiplier.

The server 120 analyzes data records to identify one or more data records associated with the one or more selected categories and/or merchants (step 530). In this embodiment, the data records are the transaction data records maintained by the database 140. The server 120 may analyze the transaction data records each time a transaction is made by the user. For example, each time a transaction record is added to the account of the user, indicating a new transaction, the server 120 may analyze the transaction record to determine if the transaction was made at a merchant associated with the one or more selected categories, at a tenant merchant, or at a merchant associated with an anchor category. Alternatively, the server 120 may analyze the transaction data records periodically. For example, at the end of each business day, the server 120 may analyze the transaction data records to determine if any new transactions were made at a merchant associated with the one or more selected categories, at a tenant merchant or at a merchant associated with an anchor category.

The server 120 assigns a value to the identified one or more data records based on the particular multiplier for the one or more selected categories and/or merchants (step 540). For each identified data record, the server 120 calculates a loyalty point amount to be added to a value account of the user. For example, a data record having a transaction amount of ten dollars ($10) may be associated with the selected category of "food delivery" which may have an associated multiplier of "3×". As such, the server 120 assigns a value of thirty (30) loyalty points to the identified data record.

The server 120 updates a value account of the user based on the assigned values (step 550). The server 120 updates the value account based on the calculated loyalty point amount. For example, where the server 120 assigns a value of thirty (30) loyalty points during step 540, the server 120 sends a signal to the database 140 to update the value account of the user with thirty (30) loyalty points.

As mentioned, a default multiplier may be used for any transactions made at a merchant that is not associated with a selected category, at a merchant that is not a tenant merchant, or at a merchant that is not associated with an anchor category. As such, the server 120 assigns a value for all transaction records that are not identified during step 530 based on the default multiplier and updates the value account of the user.

As mentioned, a merchant may be identified as a tenant merchant for a particular category. When a merchant has been identified as a tenant merchant, during step 530, the server 120 analyzes data records to identify one or more data records associated with the tenant merchant. When one or more data records have been identified as being associated with the tenant merchant, during step 540, the server 120 assigns a value to the identified data records.

In another embodiment where a merchant is identified as a tenant merchant for a particular category, during step 530, the server 120 may analyze the data records to identify one or more data records associated with the particular category of the tenant merchant. When one or more data records have been identified as being associated with the particular category of the tenant merchant, during step 540, the server 120 only assigns a value to the data records associated with the tenant merchant. The server 120 may assign a value based on the default multiplier, for example 1×, for any data records associated with the particular category that are not associated with the tenant merchant.

Figure 6:
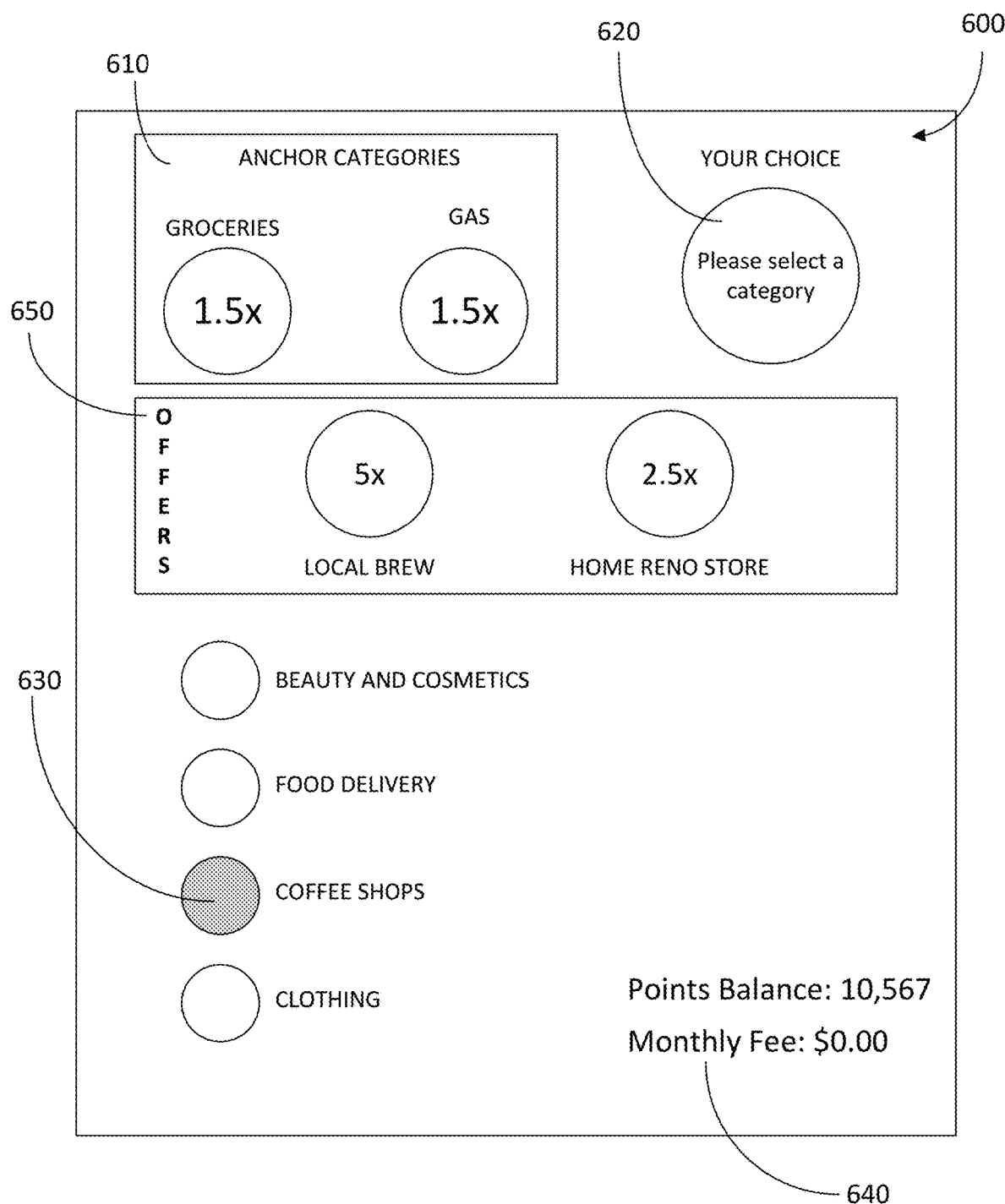
FIG. 6 is an example interface displayed on a display screen of a computing device according to an embodiment.

Examples of a user selecting one or more categories and/or merchants for multipliers using an interface provided during method 500 will now be described. An example interface 600 is shown in FIG. 6. In this example, the interface 600 includes anchor categories 610. In this example, the anchor categories 610 include "Groceries" and "Gas". Each anchor category has been assigned a multiplier of "1.5×". As mentioned, anchor categories cannot be changed by the user and as such are not selectable by the user within the interface.

The interface 600 includes an icon 620 labelled as "YOUR CHOICE." As will be described, the icon 620 is configured to display information associated with a selected category. The information may include a name of the selected category and the particular multiplier associated with the selected category. In the example shown in FIG. 6, a category has not yet been selected and as such the icon 620 displays information requesting that the user select a category.

The interface 600 includes selectable options 630. In this example, the selectable options 630 include the categories "Beauty and Cosmetics", "Food Delivery", "Coffee Shops" and "Clothing". The selectable options 630 displayed within the interface 600 may be determined by the server 120 in a number of ways. For example, the server 120 may identify categories that the user has most frequently spent money on based on historical transaction data. As another example, the server 120 may identify categories that are popular amongst other customers. As yet another example, the server 120 may identify categories based on a demographic of the user. For example, the server 120 may identify categories that are popular amongst customers having a similar age to the user. Although not shown, the interface 600 may include one or more selectable options that, when selected, allow the user to pick one or more categories from a list. The list may include all categories available for selection, that is, all categories recognized by the server 120.

Each selectable option 630 may be selected by the user performing, for example a tap gesture on a display screen of the computing device 110 at a location corresponding to the selectable option. As another example, each selectable option 630 may be selected by the user performing, for example, a drag and drop operation on the display screen of the computing device 110. The drag and drop operation may begin at the location of one of the selectable options 630 and may end at the location of the icon 620.

The interface 600 also displays information 640 associated with the account of the user. In this example, the information 640 includes a points balance of the user and a fee associated with the categories, merchants and/or multipliers selected by the user.

The interface 600 also displays offers 650 to the user. In this example, the offers 650 include icons associated with one or more partner merchants providing an offer for multipliers to the user. As shown in the interface 600, a coffee shop merchant named "Local Brew" has offered the user a "5×" multiplier and a home renovation merchant named "Home Reno Store" has offered the user a "2.5×" multiplier. The offers may be accepted by the user by performing, for example, a tap gesture at a location on a display screen of the computing device 110 corresponding to one of the icons of the offers 650.

Figure 7:
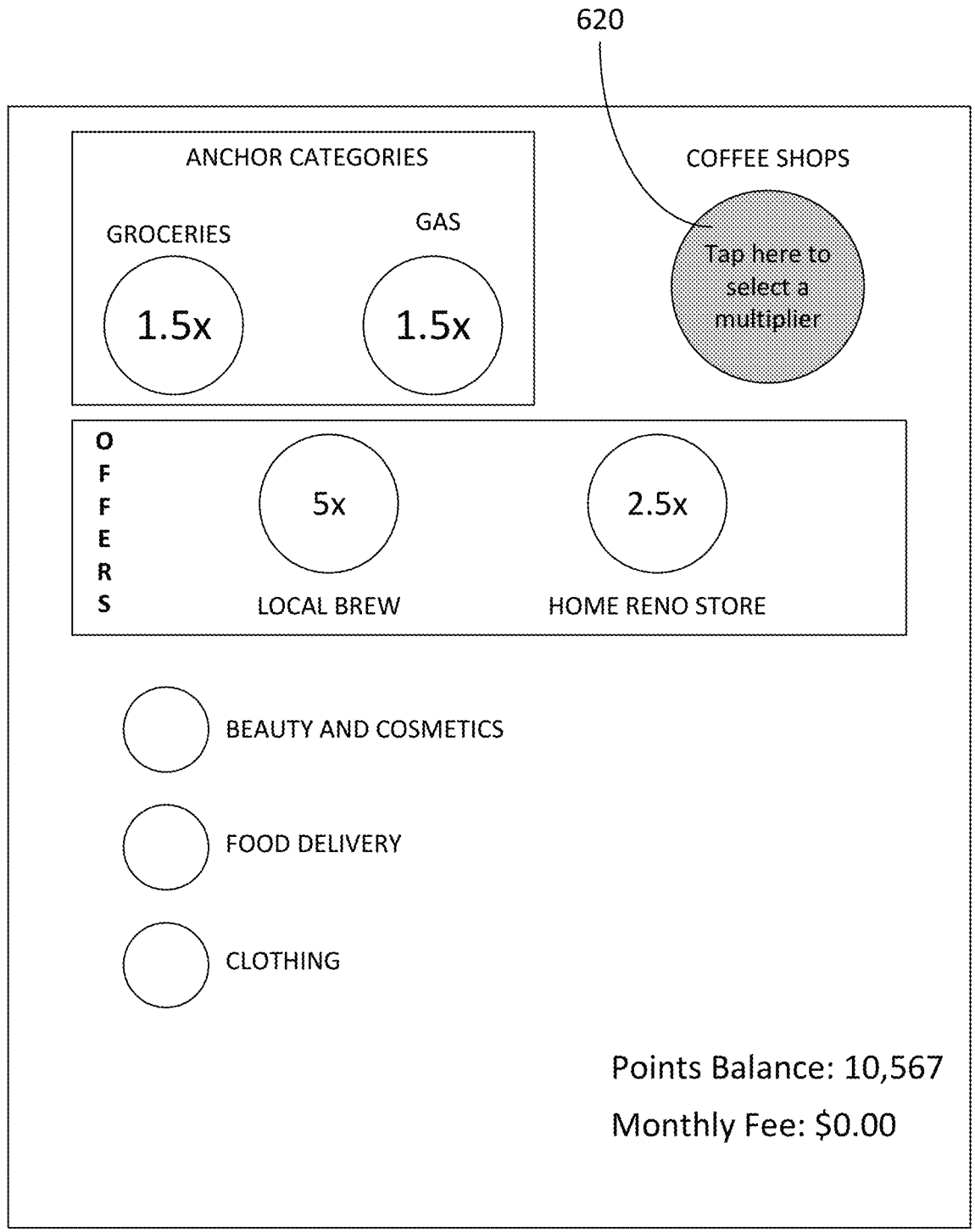
FIG. 7 is an example interface displayed on a display screen of a computing device according to an embodiment.

In the example shown in FIG. 6, the user may select the selectable option 630 associated with "Coffee Shops" by performing, for example, a tap gesture on the display screen of the computing device 110. In response, the interface may be updated as shown in FIG. 7. As can be seen, the icon 620 is updated to indicate that the category "Coffee Shops" has been selected. The icon 620 is also updated to include information requesting that the user select a multiplier for the selected category. The list of selectable options 630 is updated to remove "Coffee Shops".

Figure 8:
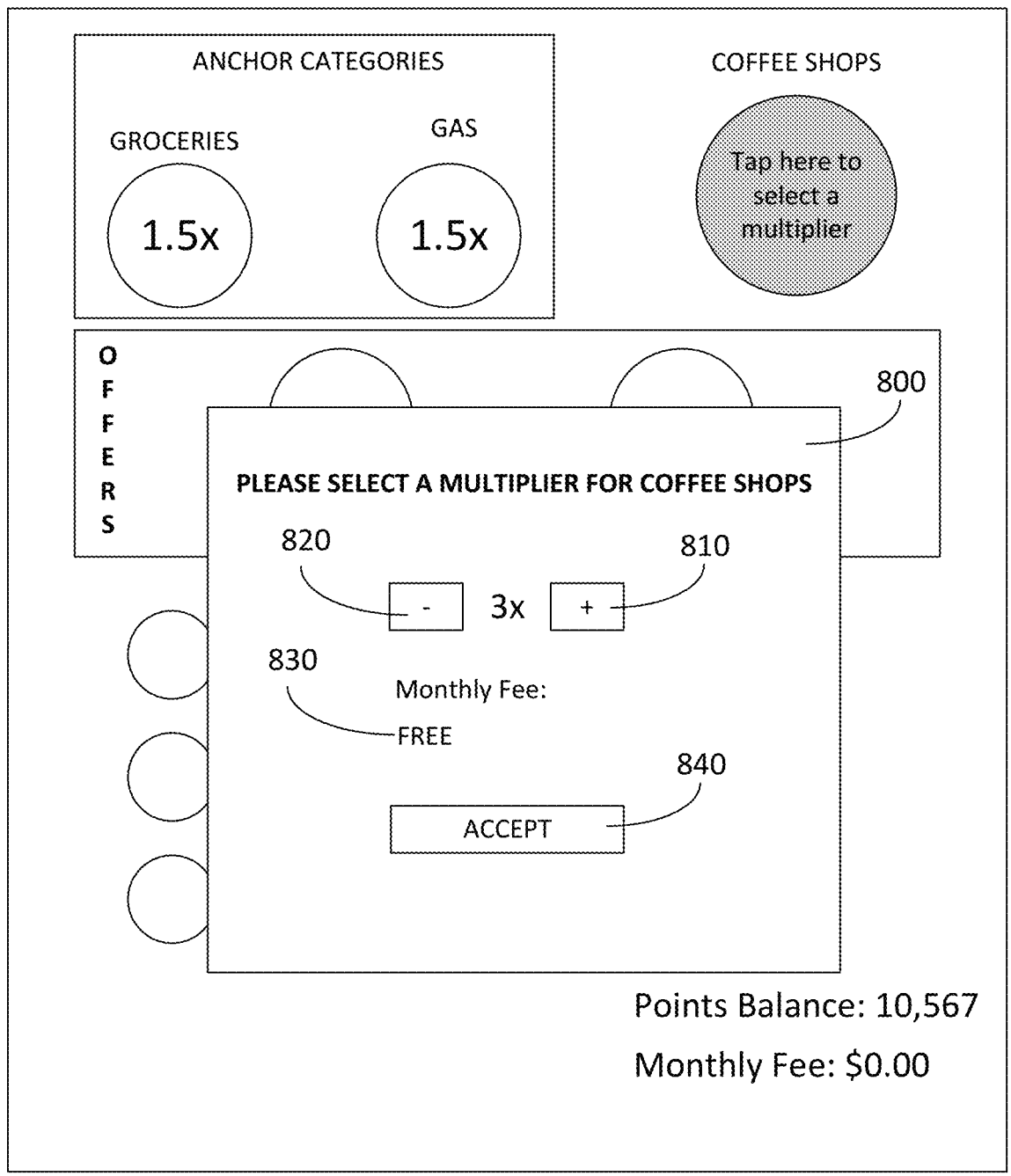
FIG. 8 is an example interface displayed on a display screen of a computing device according to an embodiment.

In the example shown in FIG. 7, the user may select the icon 620 by performing, for example, a tap gesture on the display screen of the computing device 110. In response, the interface may be updated as shown in FIG. 8. As can be seen, a pop-up window 800 appears on top of the interface 600. The pop-up window 800 displays a multiplier and includes a selectable option 810 to increase the multiplier for the selected category and a selectable option 820 to decrease the multiplier for the selected category. The pop-up window 800 also displays information 830 associated with the displayed multiplier. In this example, the information includes a fee associated with the displayed multiplier. The pop-up window 800 also includes a selectable option 840 that, when selected, accepts the displayed multiplier.

Figure 9:
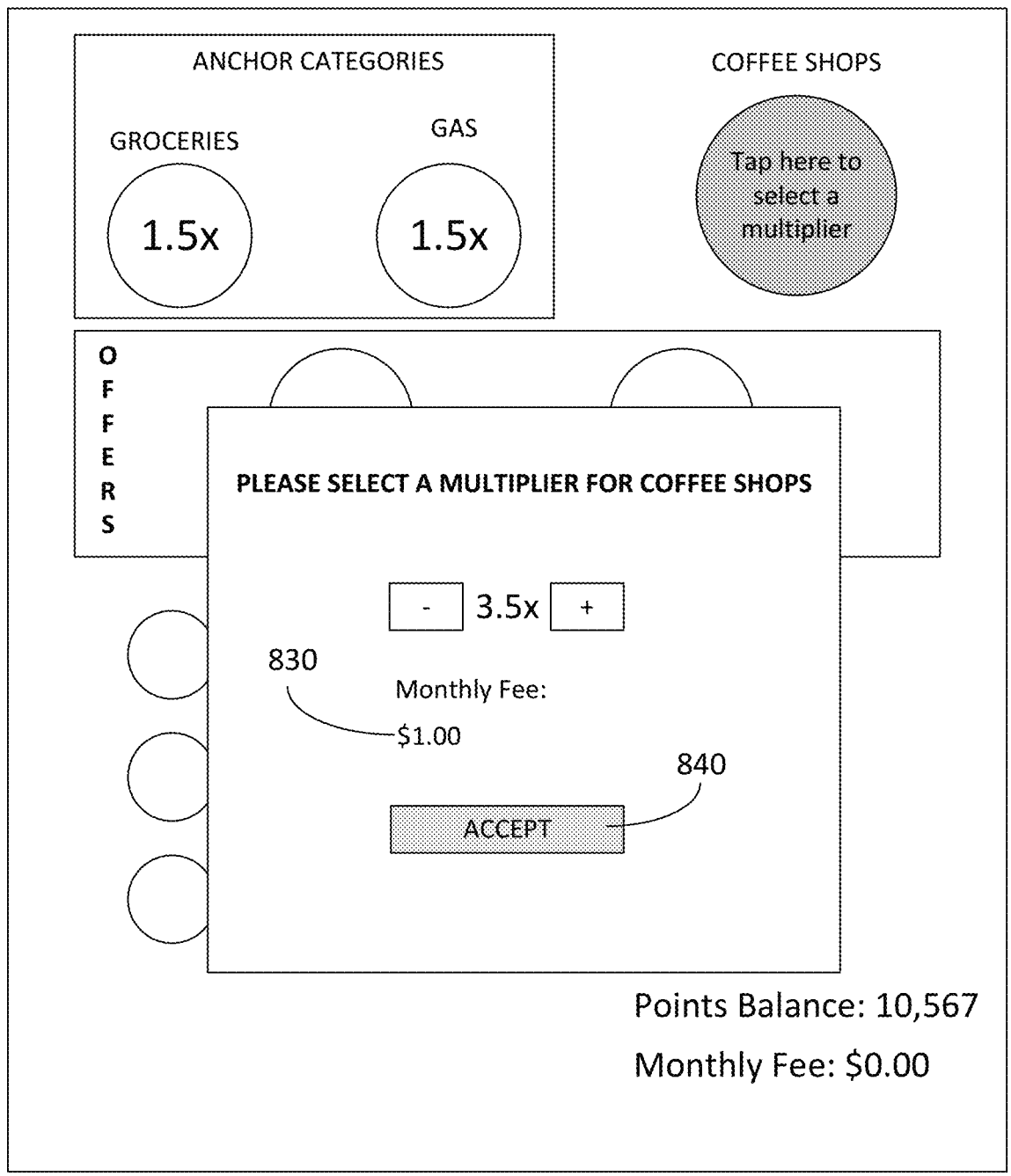
FIG. 9 is an example interface displayed on a display screen of a computing device according to an embodiment.

In the example shown in FIG. 8, the user may adjust the multiplier for the selected category by performing a tap gesture on selectable option 810 or selectable option 820. In response, the displayed multiplier and the information 830 associated with the displayed multiplier are updated. An example is shown in FIG. 9. As can be seen, the user has adjusted the multiplier to "3.5×". A monthly fee is required for this multiplier and as such the information 830 is updated to indicate that the monthly fee is "$1.00". The user may accept the displayed multiplier by selecting the selectable option 840. The displayed multiplier is thus set as the particular multiplier for the particular category and the server 120 accordingly updates the conversion rate data records of the user.

Figure 10:
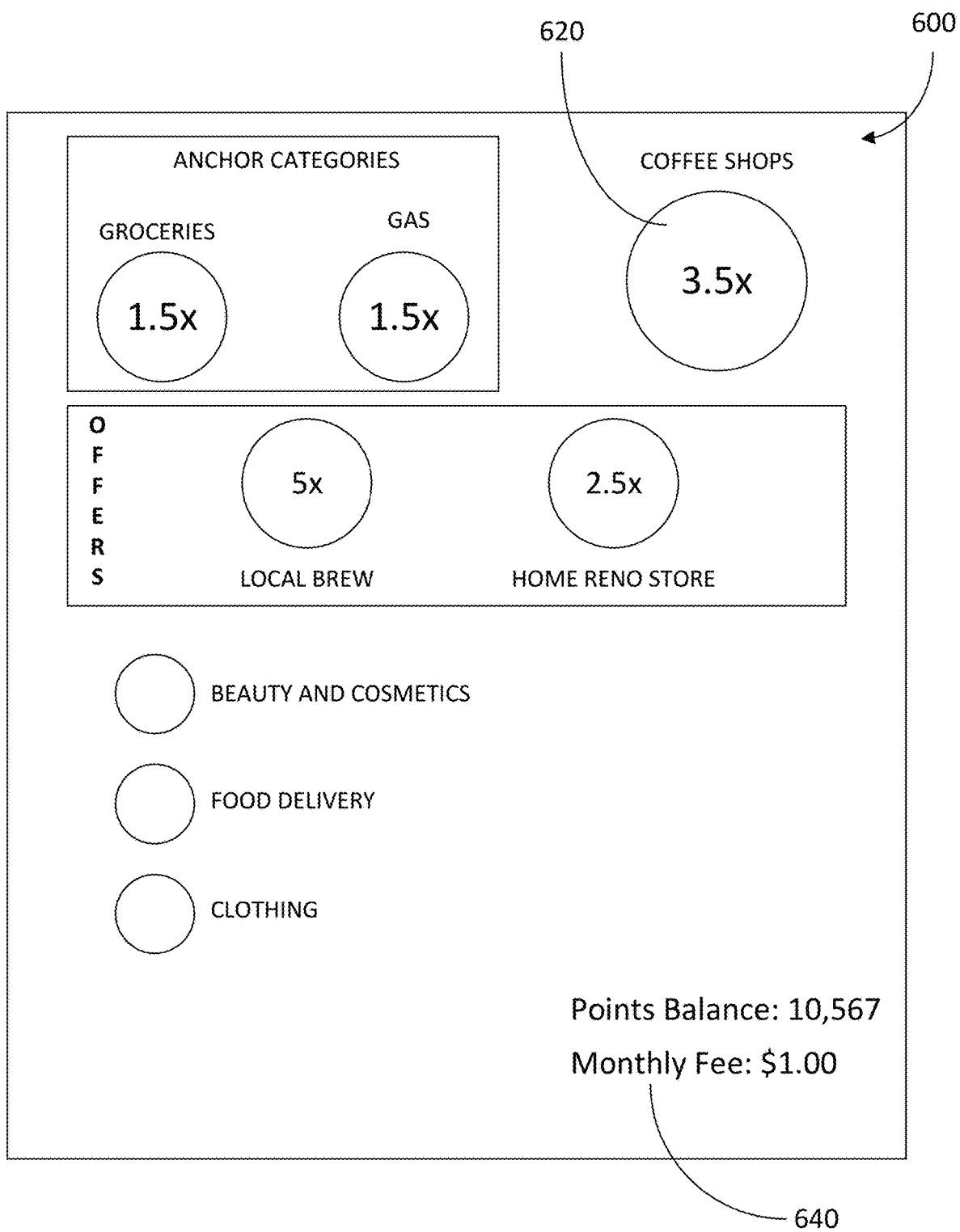
FIG. 10 is an example interface displayed on a display screen of a computing device according to an embodiment.

In response to the user selecting the selectable option 840, the pop-up window 800 disappears and the interface 600 is updated. An example is shown in FIG. 10. As can be seen, the icon 620 is updated to display the particular modifier of "3.5×" for the selected category of "Coffee Shops". The information 640 is updated to indicate the monthly fee of $1.00 based on the particular multiplier.

As mentioned, the interface 600 displays offers 650 for multipliers to the user. The displayed offers 650 include icons associated with one or more partner merchants providing an offer for multipliers to the user. As shown in the interface 600, a coffee shop merchant named "Local Brew" has offered the user a "5×" multiplier and a home renovation merchant named "Home Reno Store" has offered the user a "2.5×" multiplier. The offers may be accepted by the user by performing, for example, a tap gesture at a location on a display screen of the computing device 110 corresponding to one of the icons of the offers 650.

Figure 11:
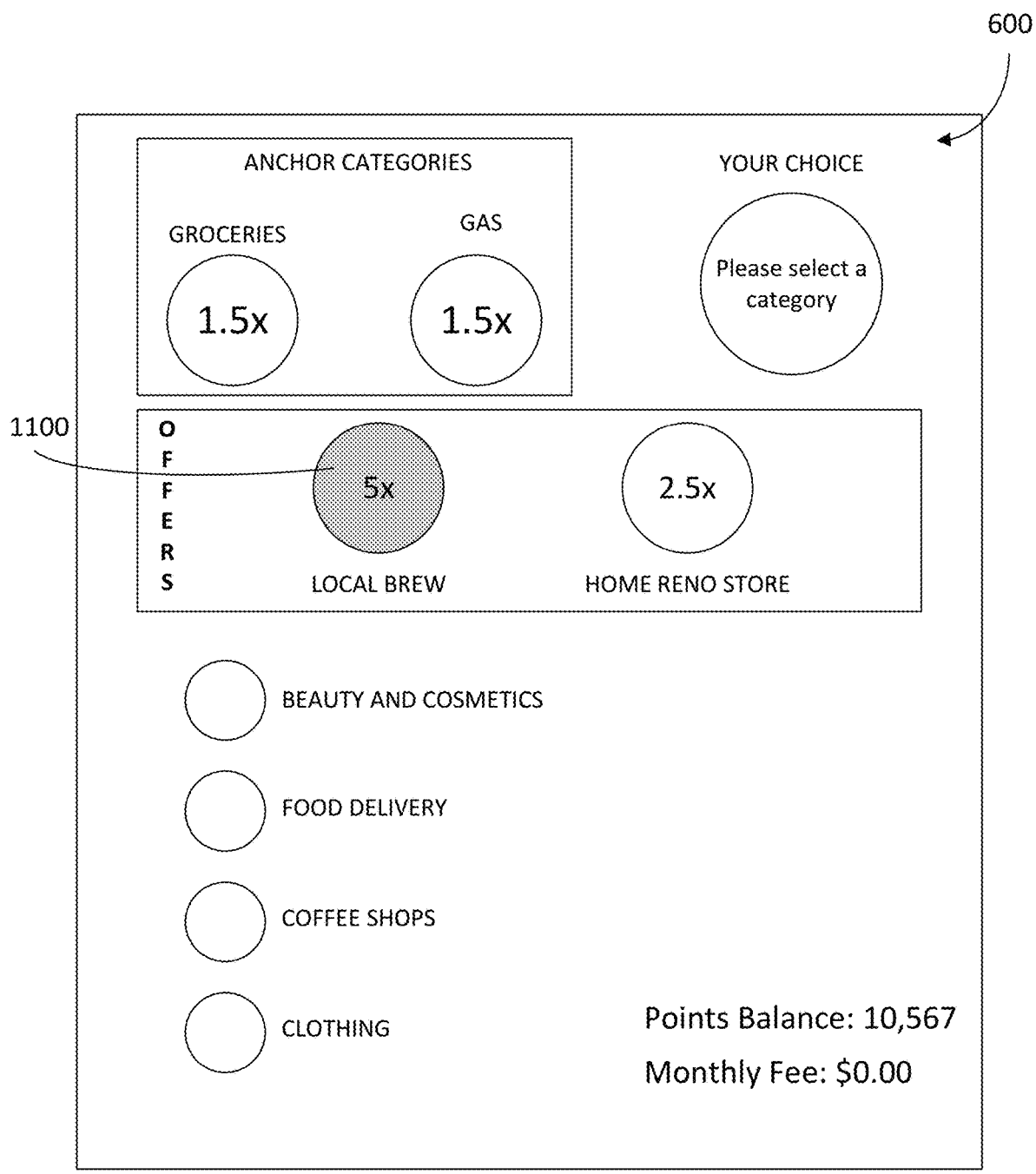
FIG. 11 is an example interface displayed on a display screen of a computing device according to an embodiment.

An example of the user accepting an offer is shown in FIG. 11. In this example, the user has selected an icon 1100 associated with the offer from "Local Brew".

Figure 12:
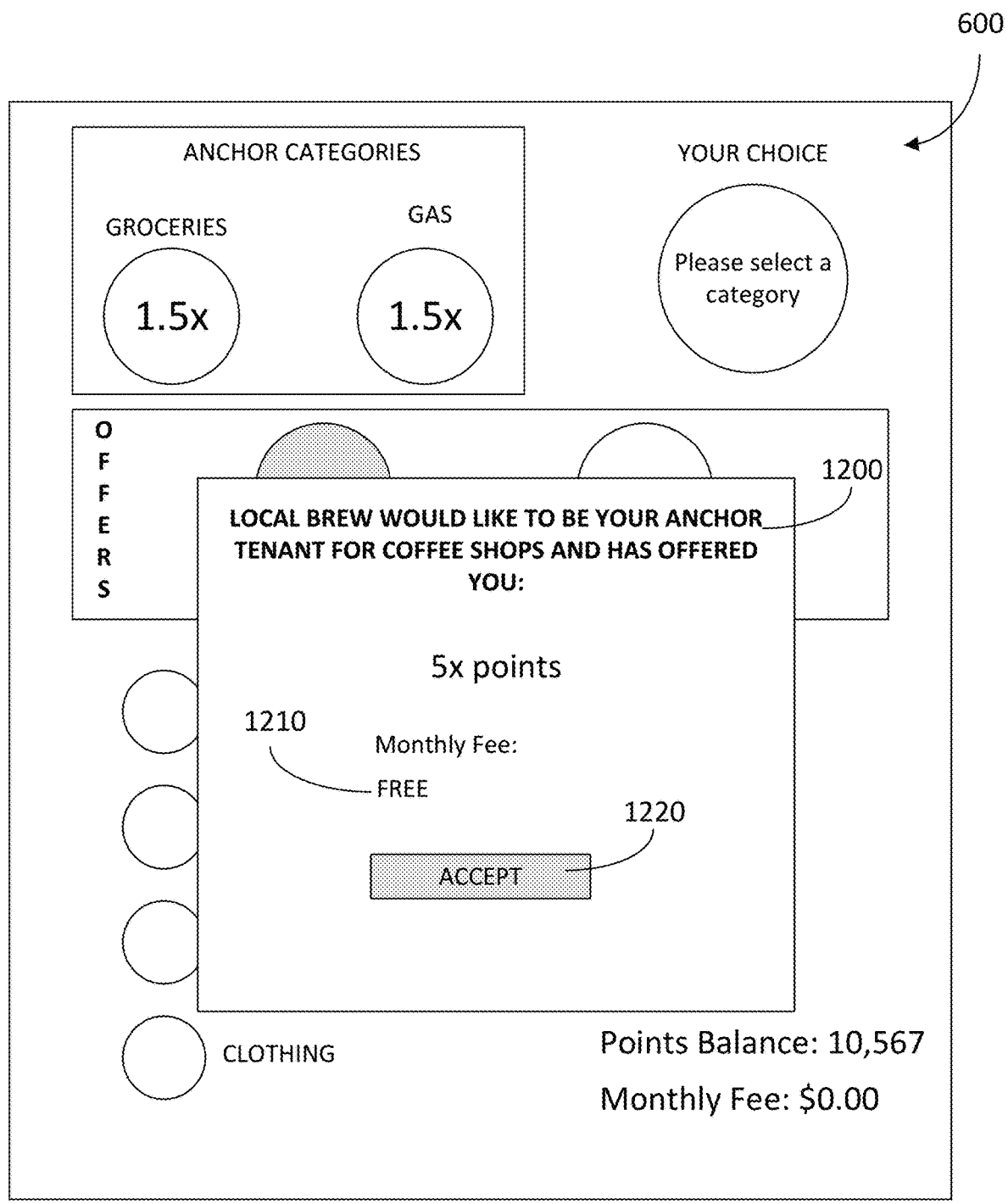
FIG. 12 is an example interface displayed on a display screen of a computing device according to an embodiment.

In response to the user selecting the icon 1100, a pop-up window 1200 appears on top of the interface 600 as shown in FIG. 12. The pop-up window 1200 displays the multiplier offered and information 1210 associated with the offer. In this example, the information 1210 includes information indicating that there is no fee to the user to accept the offer from "Local Brew". The pop-up window 1200 also includes a selectable option 1220 that, when selected, accepts the offer.

Figure 13:
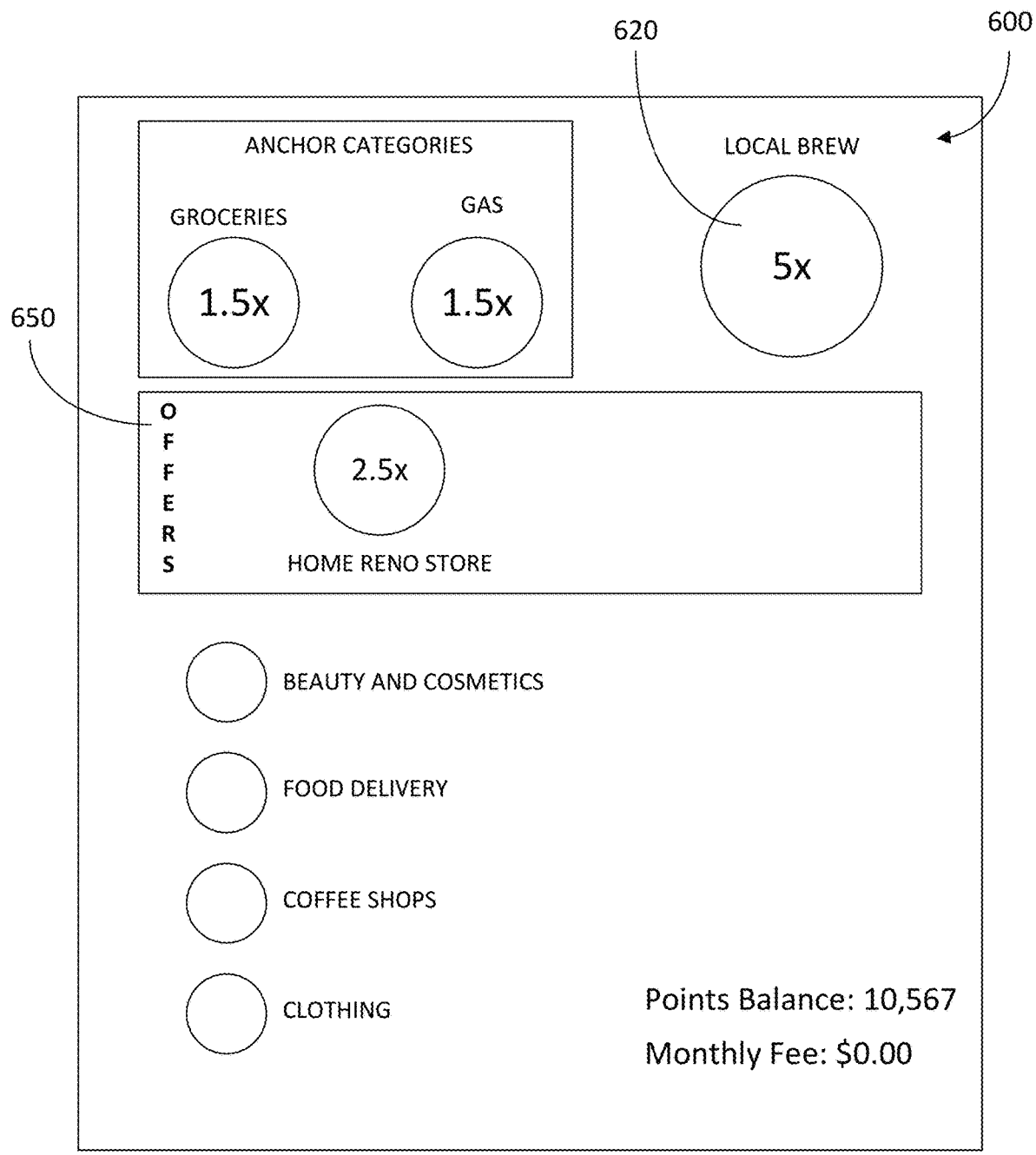
FIG. 13 is an example interface displayed on a display screen of a computing device according to an embodiment.

In response to the user selecting the selectable option 1220 to accept the offer, the pop-up window 1200 disappears and the interface 600 is updated. An example is shown in FIG. 13. As can be seen, the icon 620 is updated to display the particular modifier of "5×" for "Local Brew". By displaying the name of the merchant ("Local Brew"), rather than the category ("Coffee Shops"), the interface 600 indicates that the merchant is the tenant merchant for the category. The offers 650 displayed on the interface 600 are also updated to remove the selected offer.

Figure 14:
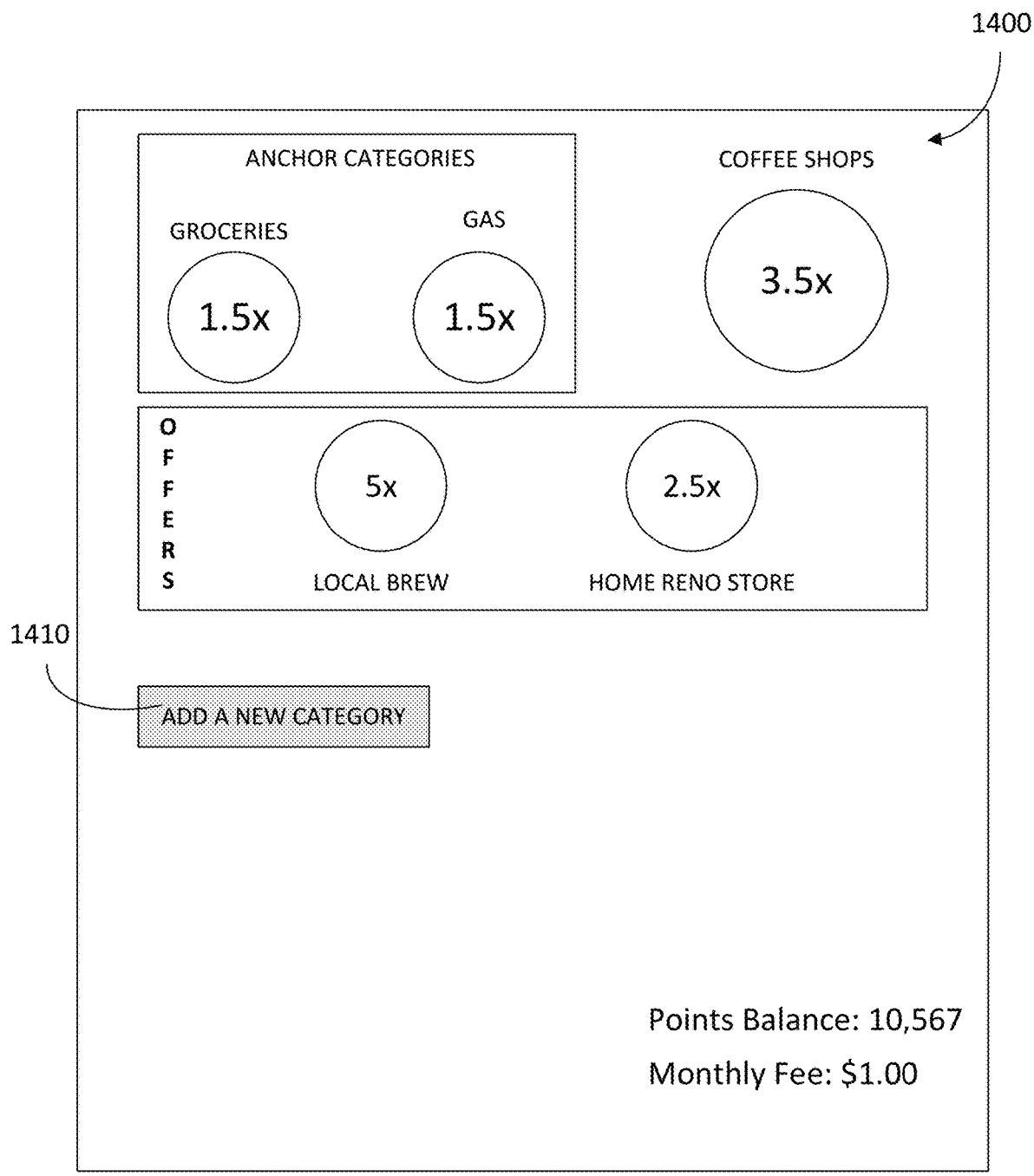
FIG. 14 is an example interface displayed on a display screen of a computing device according to an embodiment.

The interface may include a selectable option allowing the user to add additional categories and/or merchants eligible for point multipliers. An example interface 1400 is shown in FIG. 14. The interface 1400 is generally similar to that of interface 600 with the exception that, rather than displaying icons associated with categories that can be selected by the user, the interface 1400 includes a selectable option 1410 that, when selected, allows the user to add additional categories and/or merchants eligible for point multipliers.

Figure 15:
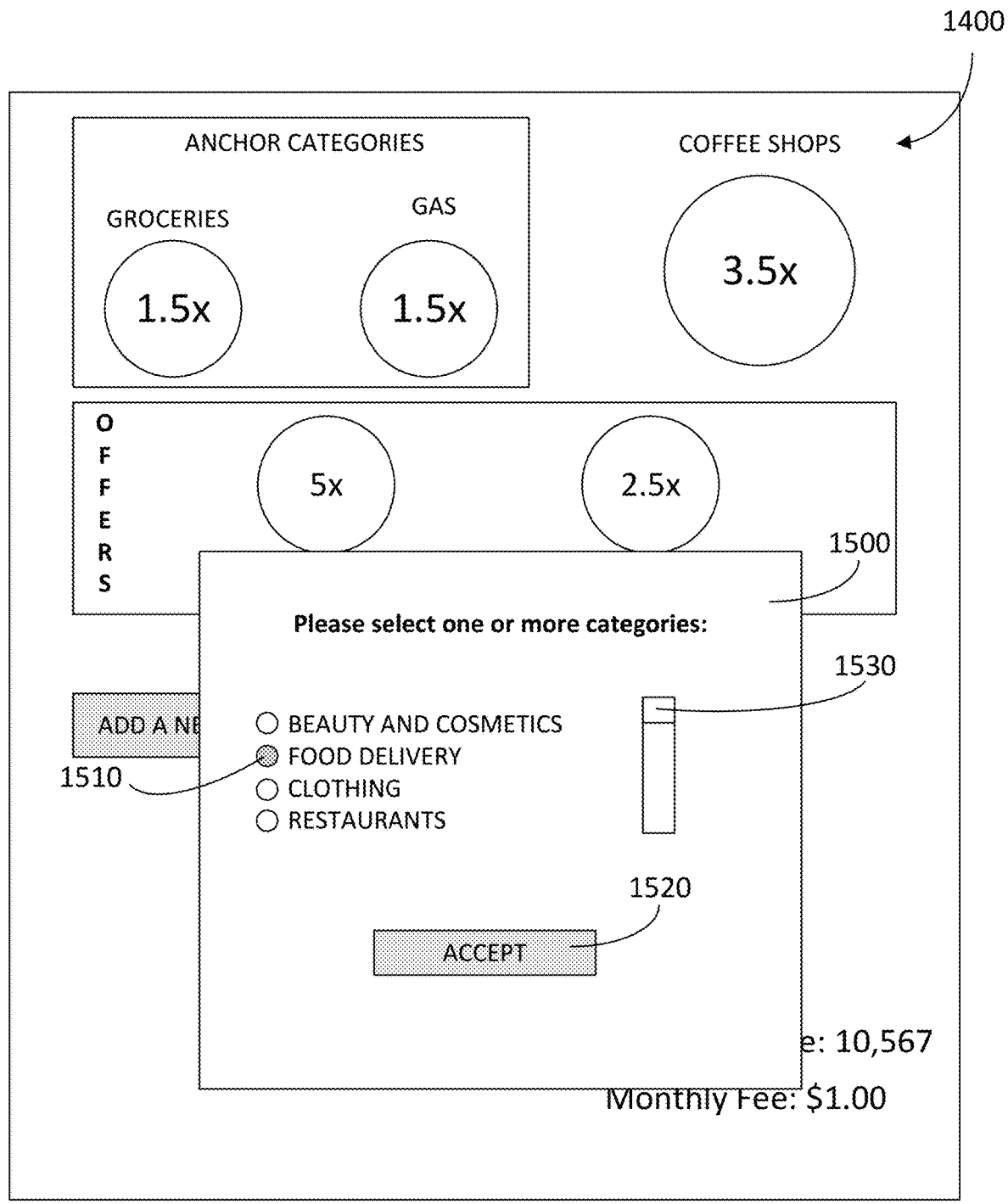
FIG. 15 is an example interface displayed on a display screen of a computing device according to an embodiment.

In response to the selectable option 1410 being selected by the user, a pop-up window 1500 appears that includes a list of categories and/or merchants to be selected for multipliers as shown in FIG. 15. The pop-up window 1500 includes one or more selectable options 1510 each of which is associated with a particular category. The user may select one or more of the selectable options by performing a touch gesture at a location on the display screen of the computing device 110 corresponding to the location of one or more of the selectable options 1510. The pop-up window 1500 includes a selectable option 1520 that, when selected, accepts the selected one or more categories. The pop-up window 1500 also includes a scroll bar 1530 that may be manipulated by the user to scroll up and down the list of categories.

Although the list shown in FIG. 15 only includes categories, it will be appreciated that the list may additionally or alternatively include merchants. As another example, a selectable option such as a toggle button may be used to toggle between a list of merchants and/or a list of tenants. The list of merchants and/or tenants may be generated by the server 120 in a number of ways such as for example, based on historical transaction data of the user or based on popular categories or merchants as determined by the server 120. The pop-up window 1500 may display additional information such as for example the fee associated with selecting an additional one or more categories.

In the example shown in FIG. 15, the user selects the category of "Food Delivery" for multipliers. In response to the user selecting the selectable option 1520, another pop-up window may appear prompting the user to select a multiplier for the selected category. The pop-up window may be similar to that shown in FIG. 8.

Figure 16:
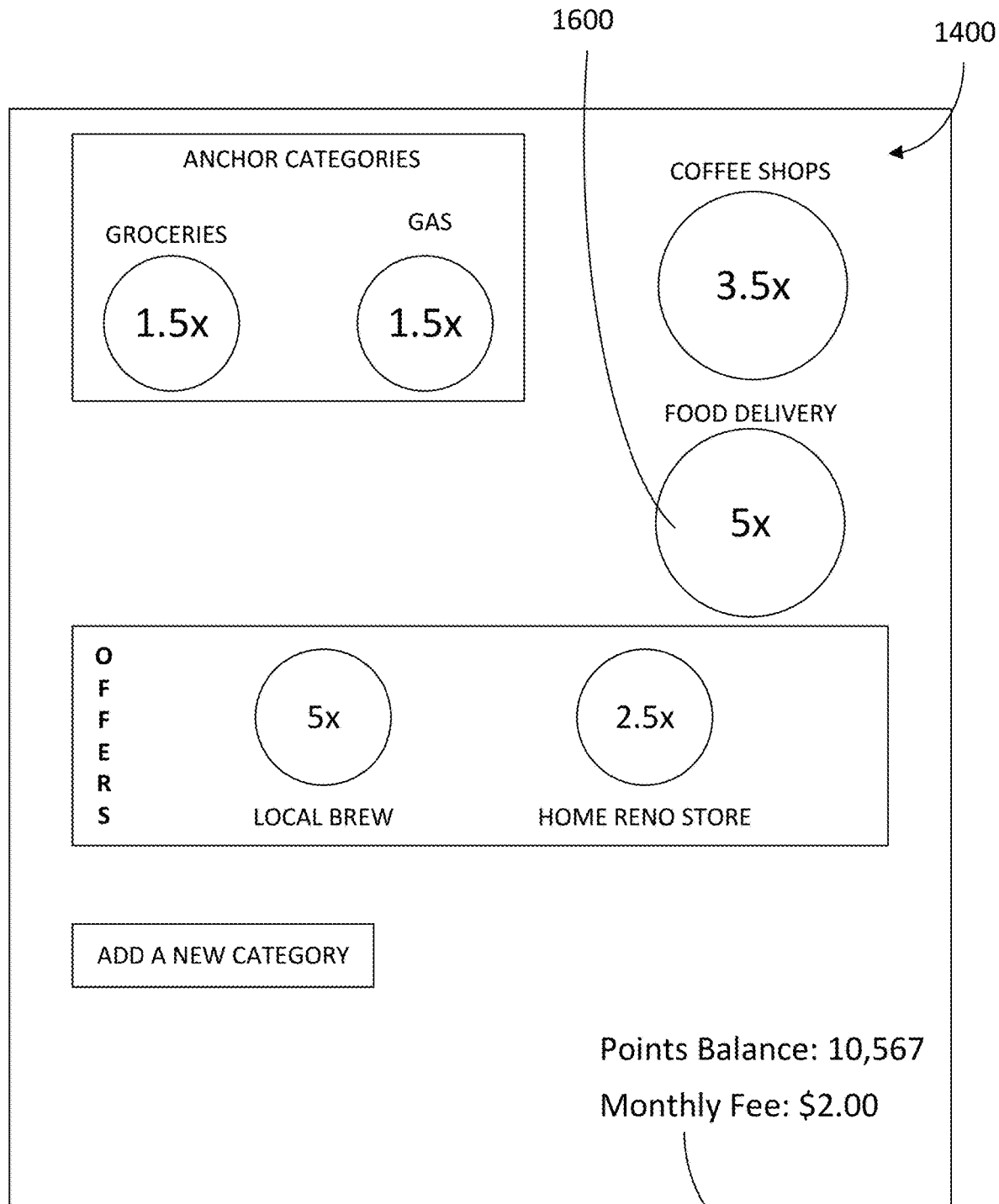
FIG. 16 is an example interface displayed on a display screen of a computing device according to an embodiment.

In response to the user selecting one or more additional categories and the particular multiplier for the one or more additional categories, the interface 1400 is updated. An example is shown in FIG. 16. As can be seen, an additional icon 1600 is added to the interface 1400 and displays the additional category ("Food Delivery") and the particular multiplier ("5×") as selected by the user. Information 1610 displayed on the interface 1400 is updated to indicate that the monthly fee for the user is now "$2.00", which in this example is based on the particular categories and particular multipliers selected by the user. In addition, icons displayed within the interface 1400 are re-arranged to accommodate the additional category. It will be appreciated that additional categories and/or merchants may be added by the user in a similar manner.

In embodiments described herein, the user may only be allowed to modify selected categories and/or merchants periodically. For example, the user may only be allowed to change a selected category and/or merchant once per month or once per year. The server 120 may store data indicating when the user has selected a category. When a period of time has expired, such as for example one month, the server 120 may generate a notification and send a signal including the notification to the computing device 110 indicating that the time has expired and that the user may change the one or more selected categories and/or merchants. The user may however override the rule by paying a fee, for example. The time limit may not apply for adding categories and/or merchants. That is, the user may be permitted to add categories and/or merchants at any time. The user may be required to pay a fee to add additional categories and/or merchants.

Figure 17:
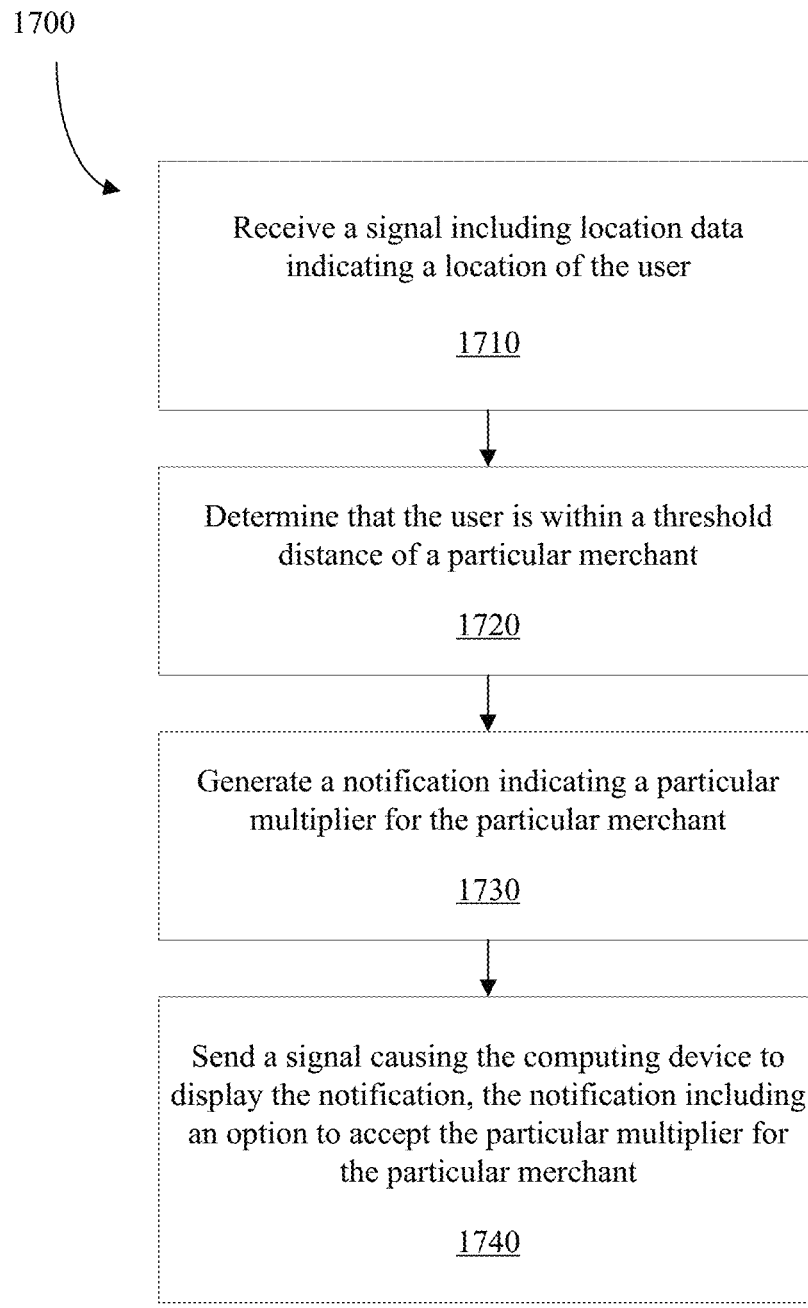
FIG. 17 is a flowchart showing operations performed by a server generating location based multiplier notifications according to an embodiment.

In one or more embodiments, the server 120 may generate multiplier recommendations. For example, the server 120 may generate location based multiplier locations. FIG. 17 is a flowchart showing operations performed by the server 120 in generating location based multiplier recommendations according to an embodiment. The operations may be included in a method 1700 which may be performed by the server 120. For example, computer-executable instructions stored in memory of the server 120 may, when executed by one or more processors, configure the server 120 to perform the method 1700 or a portion thereof.

The server 120 receives, via the communications module and from the computing device 110, a signal including location data indicating a location of the user (step 1710). In this embodiment, the location data may be generated by the location subsystem of the sensor module 230 of the computing device 110. The location data may indicate the current geographic location of the computing device 110 and this is assumed to be the current geographic location of the user.

The server 120 determines that the user is within a threshold distance of a particular merchant (step 1720). Using the location of the user, the server 120 determines if the user is within the threshold distance of a particular merchant. The particular merchant may be identified using, for example, a geographic location of the merchant. The threshold distance may be associated with a geofence representing a virtual boundary set up around the boundary of the geographic location of the merchant. The server 120 may engage one or more application programming interfaces (APIs) such as for example Google Maps API or Geofencing API.

The server 120 generates a notification indicating a particular multiplier for the particular merchant (step 1730). In this embodiment, when it is determined that the user is within the threshold distance of a particular merchant, the server 120 generates the notification. Data used for generating the notification may be obtained from memory of the server 120 and/or from data records stored in the database 140.

In this embodiment, the notification includes a particular multiplier for the particular merchant and information identifying the particular merchant. The particular multiplier may be based on an offer provided by the particular merchant. For example, a merchant may wish to offer customers visiting their store a particular multiplier. Alternatively, the particular multiplier may be set by the server 120 based on one or more factors including historical data of the user, historical data of similar users and/or based on a default increased multiplier, etc.

The server 120 sends, via the communications module and to the computing device 110, a signal causing the computing device 110 to display the notification, the notification including an option to accept the particular multiplier for the particular merchant (step 1740). In this embodiment, the signal causes the computing device 110 to display the notification within a lock screen of an operating system of the computing device 110. The signal may also cause the computing device 110 to display the notification within a notification center of the operating system of the computing device 110.

During method 1700, multiplier recommendations are generated regardless of whether or not the user has purchased any items from the particular merchant. Put another way, previous transactions of the user are not analyzed prior to generating the recommendations. The recommendations may only be generated based on location data of the user.

Figure 18:
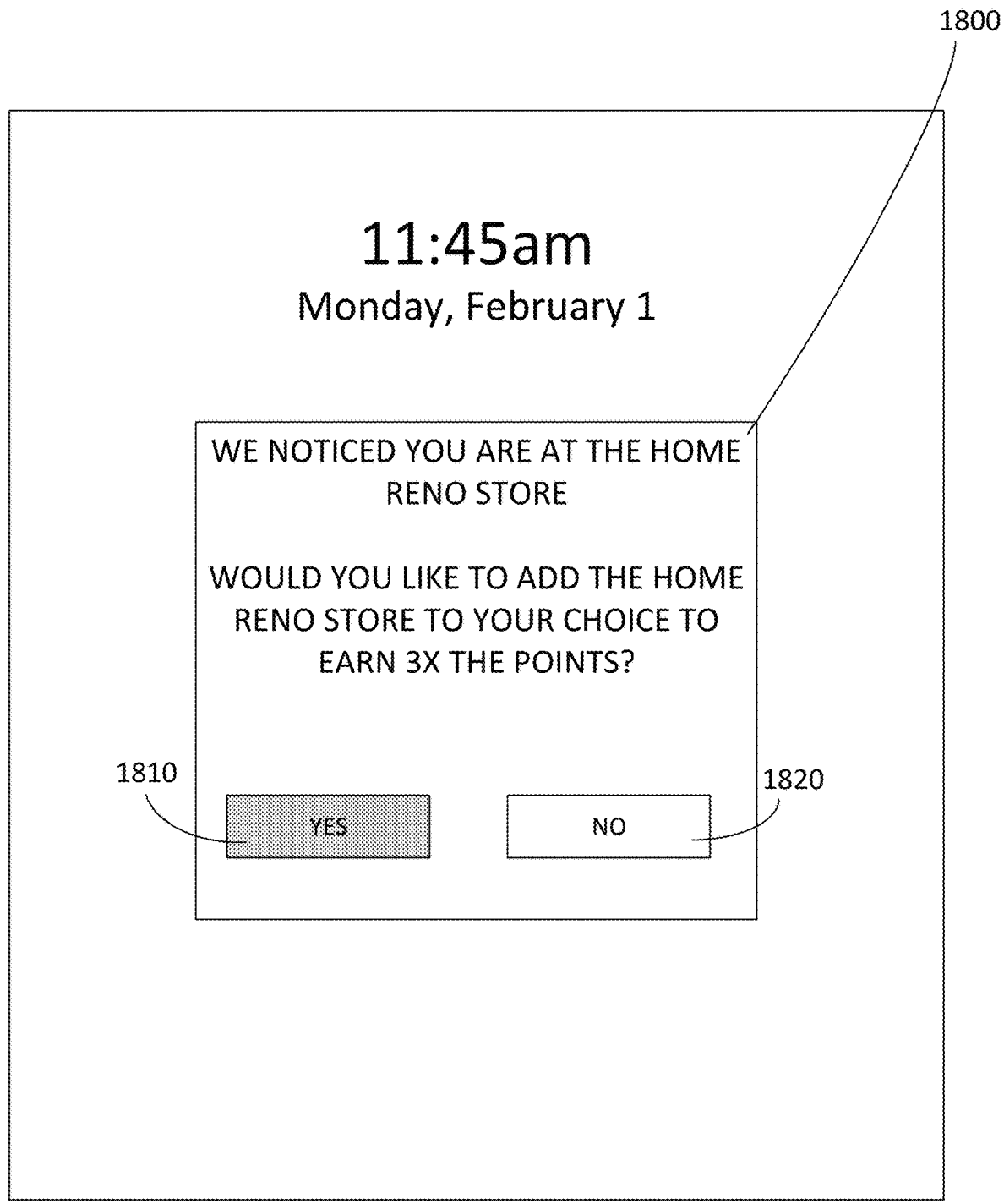
FIG. 18 is an example notification displayed on a display screen of a computing device according to an embodiment.

An example notification 1800 displayed within a lock screen of an operating system of a computing device 110 is shown in FIG. 18. The notification 1800 includes information relating to the location of the user. Specifically, the notification 1800 includes text "WE NOTICED YOU ARE AT THE HOME RENO STORE." The notification 1800 also includes information related to the offer. Specifically, the notification 1800 includes text "WOULD YOU LIKE TO ADD THE HOME RENO STORE TO YOUR CHOICE TO EARN 3× THE POINTS."

The notification 1800 includes a selectable option 1810 that, when selected, accepts the particular multiplier for the particular merchant and a selectable option 1820 that, when selected, rejects the particular multiplier for the particular merchant. In response to the user selecting the selectable option 1810, the computing device 110 sends a signal to the server 120 indicating selection of the selectable option 1810 to accept the particular multiplier for the particular merchant. In response, the server 120 sends a signal to the database 140 to update the conversion data records of the user maintained thereby to update the particular merchant with the particular multiplier. As such, any purchases made by the user at the particular merchant will result in the user receiving "3×" points.

Figure 19:
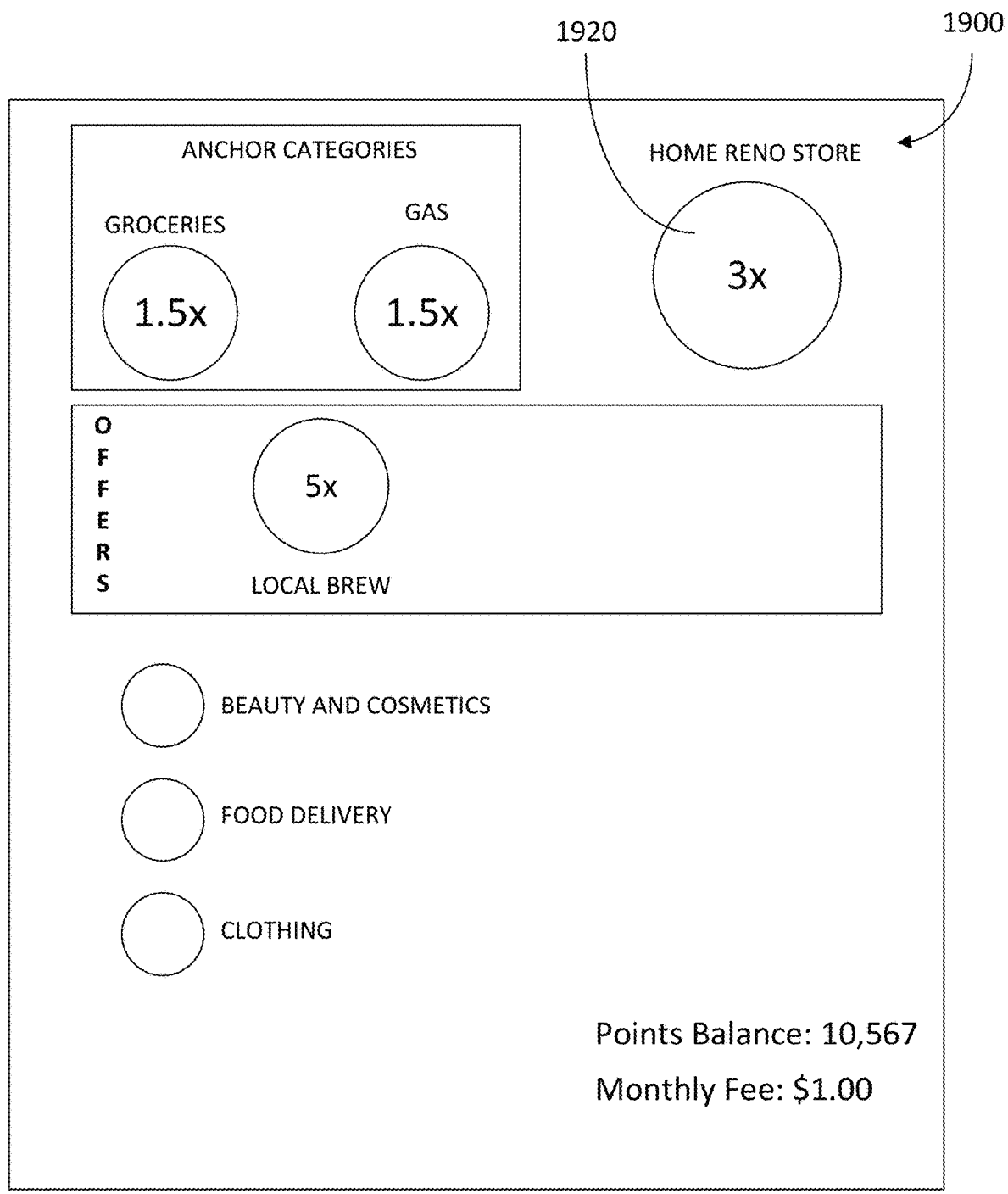
FIG. 19 is an example interface displayed on a display screen of a computing device according to an embodiment.

The server 120 may also update the interface of the loyalty point management application based on the user accepting the particular multiplier for the particular merchant. As such, when the user opens the loyalty point management application on the computing device 110, an updated interface is displayed. An example is shown in FIG. 19. As can be seen, an updated interface 1900 is displayed. The updated interface 1900 includes an icon 1920 displaying the particular modifier "3×" for "The Home Reno Store".

It will be appreciated that, in the example shown in FIGS. 18 and 19, the particular merchant is set as the tenant merchant for a particular category in response to the user accepting the particular multiplier.

Figure 20:
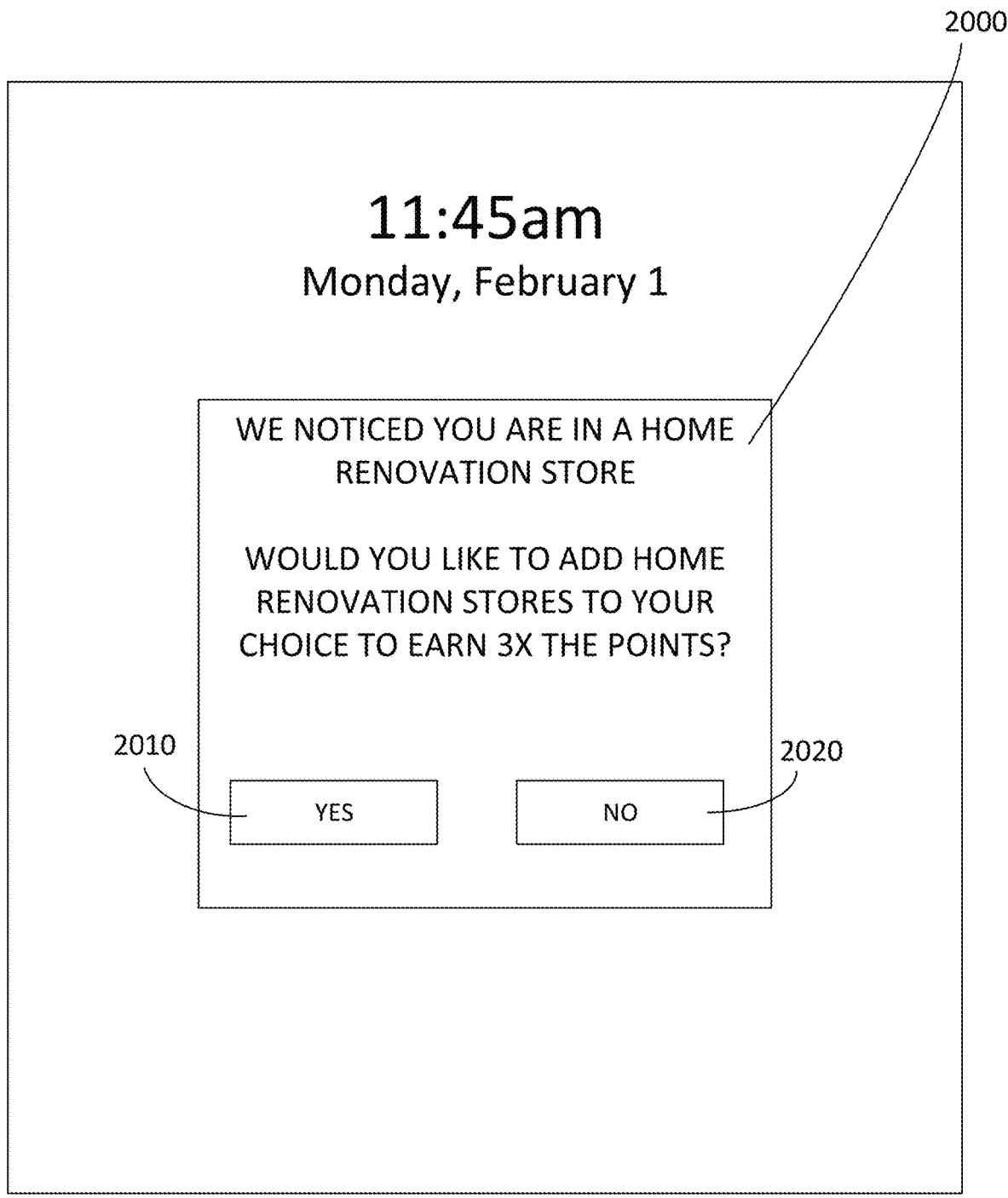
FIG. 20 is an example notification displayed on a display screen of a computing device according to an embodiment.

Although during method 1700, the notification is described including a particular multiplier for the particular merchant, the notification may additionally or alternatively include a particular multiplier for the category associated with the particular merchant. For example, during step 1730 or method 1700, the server 120 may identify the category of the particular merchant and the particular multiplier may be for the category of the particular merchant. Put another way, the particular multiplier may be for any merchants within the identified category. The notification may thus identify the category of the particular merchant. An example notification 2000 is shown in FIG. 20.

The example notification 2000 is displayed within a lock screen of an operating system of a computing device 110. The notification 2000 includes information relating to the location of the user and indicating the category associated therewith. Specifically, the notification 2000 includes text "WE NOTICED YOU ARE IN A HOME RENOVATION STORE." The notification 2000 also includes information related to the offer. Specifically, the notification 2000 includes text "WOULD YOU LIKE TO ADD HOME RENOVATION STORES TO YOUR CHOICE TO EARN 3× THE POINTS."

The notification 2000 includes a selectable option 2010 that, when selected, accepts the particular multiplier for the category and a selectable option 2020 that, when selected, rejects the particular multiplier for the category. The user may thus select the selectable option 2010 causing the computing device 110 to send a signal to the server 120 and the server 120 may update conversion data records of the user in manners similar to that described herein. The interface may also be updated as described herein.

Although during step 1720 of method 1700 the server 120 determines that the user is within a threshold distance of a particular merchant, the server 120 may perform additional checks prior to generating the notification. For example, the server 120 may analyze historical location data of the user to determine a number of times the user has visited the particular merchant within a period of time. When it is determined that the user has been located within the threshold distance of the particular merchant a predefined number of times within the period of time, the server 120 may generate the notification. The notification may include information indicating the number of times and the period of time.

Figure 21:
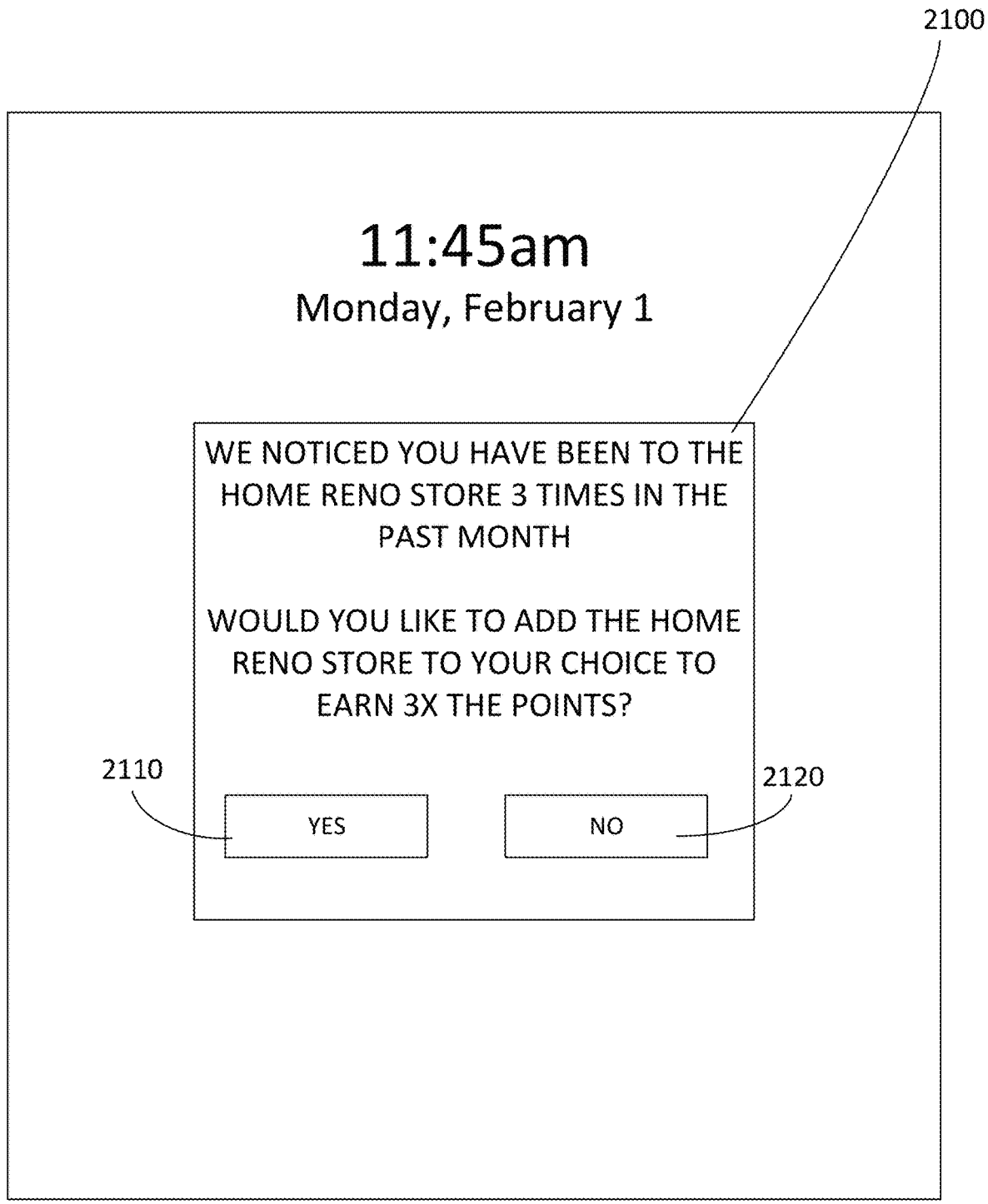
FIG. 21 is an example notification displayed on a display screen of a computing device according to an embodiment.

An example notification 2100 displayed within a lock screen of an operating system of a computing device 110 is shown in FIG. 21. The notification 2100 includes information relating to the location of the user and indicating the number of times and period of time. Specifically, the notification 2100 includes text "WE NOTICED YOU HAVE BEEN TO THE HOME RENO STORE 3 TIMES IN THE PAST MONTH." The notification 2100 also includes information related to the offer. Specifically, the notification 2100 includes text "WOULD YOU LIKE TO ADD THE HOME RENO STORE TO YOUR CHOICE TO EARN 3× THE POINTS."

The notification 2100 includes a selectable option 2110 that, when selected, accepts the particular multiplier for the particular merchant and a selectable option 2120 that, when selected, rejects the particular multiplier for the particular merchant. The user may thus select the selectable option 2110 causing the computing device 110 to send a signal to the server 120 and the server 120 may update conversion data records of the user in manners similar to that described herein. The interface may also be updated as described herein.

In another embodiment, the server 120 may analyze historical location data of the user to determine a number of times the user has visited merchants within a particular category within a period of time. When it is determined that the user has been located within the threshold distance of merchants within a particular category a predefined number of times within the period of time, the server 120 may generate the notification. The notification may include information indicating the number of times and the period of time.

Figure 22:
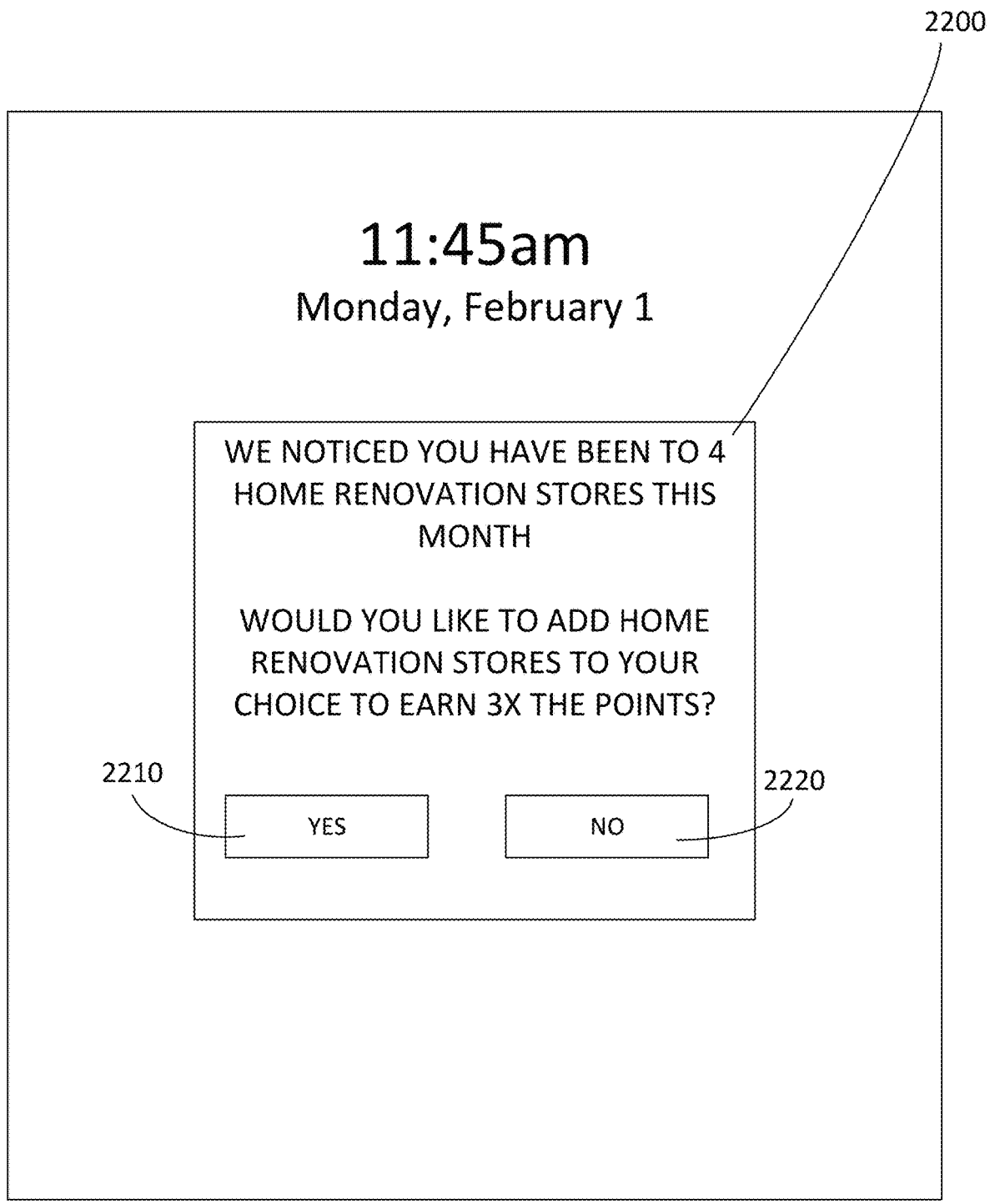
FIG. 22 is an example notification displayed on a display screen of a computing device according to an embodiment.

An example notification 2200 displayed within a lock screen of an operating system of a computing device 110 is shown in FIG. 22. The notification 2200 includes information relating to the category based on the location of the user and indicating the number of times and period of time. Specifically, the notification 2200 includes text "WE NOTICED YOU HAVE BEEN TO 4 HOME RENOVATION STORES IN THE PAST MONTH." The notification 2200 also includes information related to the offer. Specifically, the notification 2200 includes text "WOULD YOU LIKE TO ADD HOME RENOVATION STORES TO YOUR CHOICE TO EARN 3× THE POINTS."

The notification 2200 includes a selectable option 2210 that, when selected, accepts the particular multiplier for the particular merchant and a selectable option 2220 that, when selected, rejects the particular multiplier for the particular merchant. The user may thus select the selectable option 2210 causing the computing device 110 to send a signal to the server 120 and the server 120 may update conversion data records of the user in manners similar to that described herein. The interface may also be updated as described herein.

Figure 23:
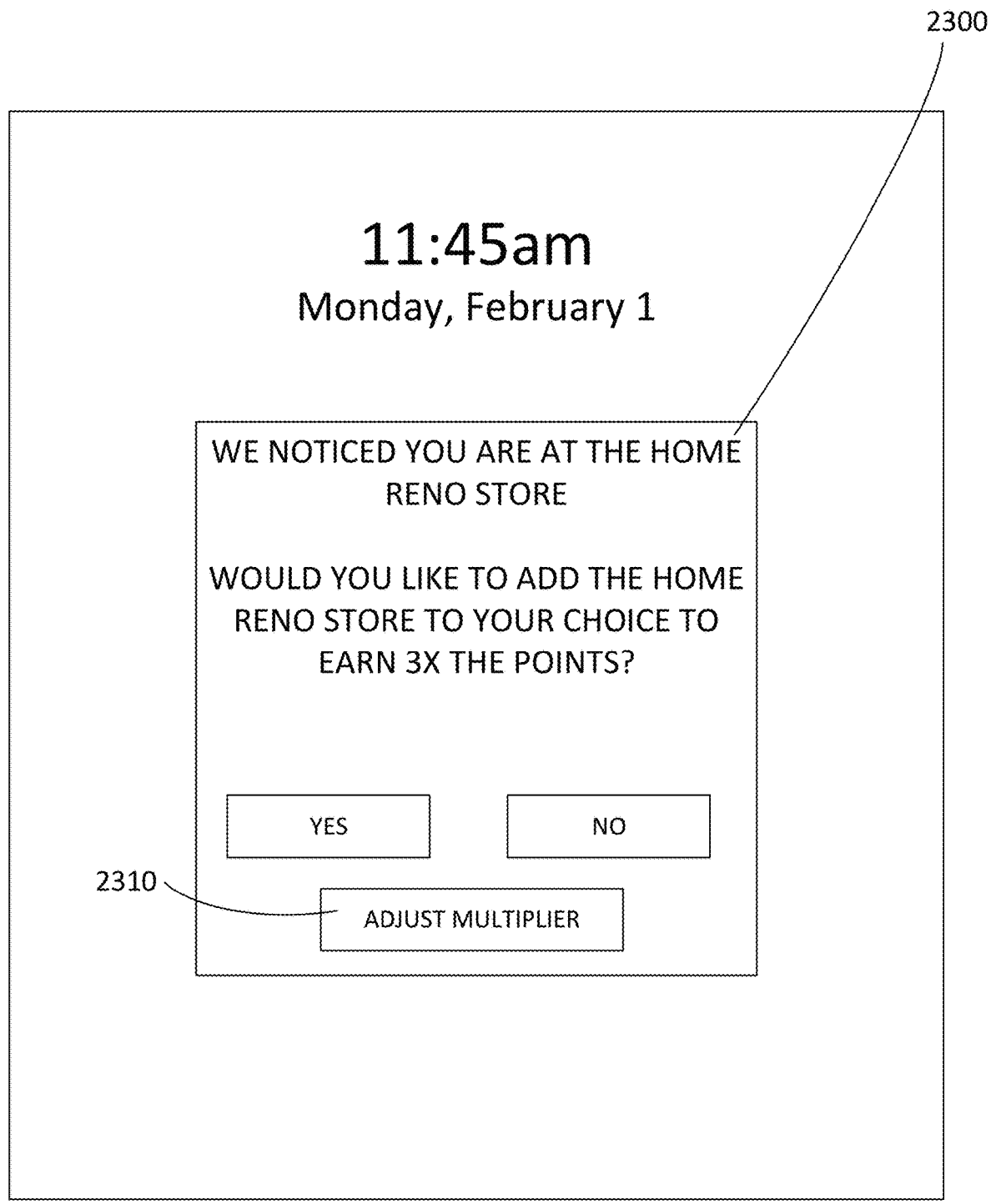
FIG. 23 is an example notification displayed on a display screen of a computing device according to an embodiment.

In another embodiment, the notification may include a selectable option to adjust the particular multiplier for the particular merchant and/or category. An example notification 2300 is shown in FIG. 23. As can be seen, the notification 2300 includes a selectable option 2310 that, when selected, allows the user to adjust the multiplier. In response to the user selecting the selectable option 2310, the computing device 110 may prompt the user to unlock the computing device 110. Once unlocked, the computing device 110 may automatically open up the loyalty point management application and a pop-up window may be displayed allowing the user to adjust the multiplier in manners similar to that shown in FIGS. 8 and 9.

In one or more embodiments described herein, the particular multiplier may only be eligible for a period of time. For example, the particular multiplier for the particular merchant may only be eligible to the user for a single visit to the merchant. In this example, the particular multiplier may only be active when the user is located within the threshold distance of the particular merchant. When it is determined that the user is no longer within the threshold distance of the particular merchant, the particular multiplier may no longer be active. In another example, the particular multiplier may be associated with a time limit. For example, when accepted by the user, the particular multiplier may only be active for a day, a week, a month, etc. The time limit may be adjusted by the user. For example, the notification may include a selectable option to adjust the time limit. Upon expiry of the time limit, a notification may be generated by the server 120 and sent to the computing device 110. The notification may include a selectable option for the user to extend the time limit and this may require, for example, an input/output modifier such as a fee. In another example, the particular multiplier may be active for a number of visits to the merchant. In this example, the particular multiplier may be valid for the next three (3) visits to the merchant.

In another embodiment, the server 120 may generate multiplier recommendations based on historical transaction data of the user. For example, the server 120 may analyze historical data of the user and may generate recommendations based on merchants or categories that the user frequently spends money on. As another example, the server 120 may analyze historical data of other users and may generate recommendations based on users having a similar age or demographic to that of the user. The recommendations may be provided to the user in manners similar to that described herein.

Although in at least some embodiments described herein notifications are described as including notifications that are displayed on the computing device 110 over a lock screen, other types of notifications may be used. For example, in another embodiment, the server 120 may engage a chat-bot module to exchange messages with the user. For example, the server 120 may send a text message to the computing device 110 that may include text such as "We noticed you are in The Home Reno Store, would you like to earn more points for your purchase?" The server 120 may be equipped with a natural language processing engine which may be used to interpret messages received from the computing device 110 and as such the user may respond to the text message. The server 120 may analyze the message and, using the chat-bot module, may respond to the message. For example, the user may reply with "Yes" and the chat-bot module may generate a response such as "You will receive 3× points for your purchase. Would you like to increase this multiplier to 4×? There may be a $1.00 fee for doing so." The user may reply and the server 120 may continue to engage in conversation with the user until the user has accepted a particular multiplier.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A system comprising:
a server in network communication with a database and with a computing device of a user, the database storing historical transaction data including: (a) transaction data records listing transactions made by customers at merchants as well as historical location data indicating geographic locations of the customers at the merchants, (b) merchant identifiers identifying the merchants in a loyalty point management application that have transacted with the customers, and (c) category labels representing one or more categories associated with each of the merchants; and
the computing device having a display screen to display and interact with the user of the computing device, the server including a hardware processor and a memory coupled to the processor, the memory storing processor-executable instructions which, when executed by the processor, configure the processor to:
transmit, by the server and to the computing device, a signal causing the computing device to display a graphical user interface (GUI) of the loyalty point management application on the display screen of the computing device, the loyalty point management application facilitating network communication between the server and the computing device of the user, the GUI displaying: (1) at least one fixed icon indicating an anchor category that can be neither changed nor selected in the GUI by the user, (2) a corresponding conversion rate associated with the anchor category, and (3) an initial user-defined icon that the user can select and change by interacting with the GUI;
extract, by the server and from the database, historical transaction data corresponding to the user including: (a) transaction data records of the user, (b) merchant identifiers associated with the transaction data records of the user, and (c) category labels associated with the transaction data records of the user;
analyze, by the server, the historical transaction data corresponding to the user;
identify, by the server and based on the analyzing, a set of at least one of category labels and merchant identifiers that have been added to the transaction data records of the user at least a threshold number of times;
generate, by the server and based on the set, a customized list of selectable options, each of the selectable options corresponding to the set that was identified as satisfying the threshold number;
display the customized list of selectable options on the GUI;
determine that the user has performed a tap gesture on the display screen of the computing device, the tap gesture indicating a user selection of a category or a merchant from the selectable options displayed on the GUI;
update, based on the user selection, the initial user-defined icon of the GUI to display loyalty point information corresponding to the user selection of the category or the merchant;
remove, from the customized list and based on the user selection, the category or the merchant that the user selected from the selectable options;
receive, by the server and from the computing device, a signal including location data indicating a current geographic location of the computing device of the user;
engage, by the server, an application programming interface to determine, based on the location data, that the current geographic location of the user is within a geofence representing a virtual boundary set up around a geographic location of a particular merchant;
determine, by the server and based on the historical location data stored in the database, that the user has visited the particular merchant a threshold number of visits within an interval of time;
responsive to determining that the current geographic location of the user is within the geofence of the particular merchant and that the user has visited the particular merchant the threshold number of visits within the interval of time, generate, by the server, a notification including offers of:
(1) an acceptance option that the user can select, using the computing device, to accept a baseline conversion rate multiplier for the particular merchant or for a particular category associated with the particular merchant as identified by one of the category labels representing the particular category in the loyalty point management application;
(2) a user-defined rate option that the user can select, using the computing device, to switch the baseline conversion rate multiplier to a new multiplier in exchange for a fee, the fee being proportional in value to a value of the new multiplier and applied to a financial account of the user, and the value of the new multiplier being greater than the baseline conversion rate multiplier, and (3) a user-defined duration option that the user can select, using the computing device, to define a time period when the baseline conversion rate multiplier and the new multiplier are active for the user to earn loyalty points with the particular merchant or the particular category;

transmit, by the server and to the computing device, a signal causing the computing device to display the notification within the GUI of the loyalty point management application, the notification offering the user, via the GUI: (1) the acceptance option to accept the baseline conversion rate multiplier, (2) the user-defined rate option to switch to the new multiplier in exchange for the fee, and (3) the user-defined duration option to define the time period when multipliers are active for earning loyalty points on future transactions involving the particular merchant or the particular category associated with the particular merchant;

receive, by the server and from the computing device, a signal indicating the time period that the user selected as well as a selected multiplier that the user selected from the notification, the selected multiplier being either the baseline conversion rate multiplier or the new multiplier;

update, by the server, conversion rate data records associated with the user to reflect the time period and the selected multiplier that the user accepted for the future transactions that occur during the time period and that involve the particular merchant or the particular category;

generate, by the server, a new user-defined icon including a value of the selected multiplier and a label indicating the particular merchant or the particular category that is associated with the selected multiplier;

transmit, by the server and to the computing device, a signal causing the computing device to display a collection of loyalty point opportunities in the GUI for the user to redeem, the collection including the new user-defined icon, the loyalty point information of the initial user-defined icon, and the fixed icon indicating the anchor category; and credit, by the server, an amount of loyalty points to the financial account of the user based on one or more of the transaction data records of the user indicating that user has completed a purchase transaction involving at least one of the particular merchant, the particular category, and the user selection of the category or the merchant.

2. The system of claim 1, wherein the processor-executable instructions, when executed by the processor, further configure the processor to:

analyze data records associated with an account of the user to identify one or more data records associated with the particular merchant;

assign a value to the one or more data records; and update the financial account of the user based on the value assigned to the one or more data records.

3. The system of claim 1, wherein the processor-executable instructions, when executed by the processor, further configure the processor to:

responsive to receiving the signal indicating selection of the acceptance option to accept the baseline conversion rate multiplier for the particular merchant or the particular category associated with the particular merchant, apply an input/output modifier to an account of the particular merchant.

4. The system of claim 1, wherein the notification includes a selectable tenant option to select the particular merchant as a tenant merchant for the particular category, and the processor-executable instructions, when executed by the processor, further configure the processor to:

receive, by the server and from the computing device, a signal indicating selection of the selectable tenant option to select the particular merchant as a tenant merchant for the particular category;

analyze data records associated with an account of the user to identify one or more data records associated with the particular category;

assign a value to data records associated with the tenant merchant based on the baseline multiplier and assign a value to data records associated with the particular category that are not associated with the tenant merchant based on a default multiplier; and update the financial account of the user based on the value assigned to the one or more data records.

5. The system of claim 4, wherein the tenant merchant is an only merchant eligible for multipliers within the particular category.

6. The system of claim 1, wherein the customized set of selectable options includes one or more selectable options generated based on a demographic of the user.

7. The system of claim 1, wherein the customized set of selectable options includes a selectable option to display all options available.

8. A computer-implemented method performed by at least one processor of a server, the computer-implemented method comprising:

storing, in a database, historical transaction data including: (a) transaction data records listing transactions made by customers at merchants as well as historical location data indicating geographic locations of the customers at the merchants, (b) merchant identifiers identifying the merchants in a loyalty point management application that have transacted with the customers, and (c) category labels representing one or more categories associated with each of the merchants;

transmitting, by the server and to a computing device of a user, a signal causing the computing device to display a graphical user interface (GUID) of the loyalty point management application on a display screen of the computing device, the loyalty point management application facilitating network communication between the server and the computing device of the user, the GUI displaying: (1) at least one fixed icon indicating an anchor category that can be neither changed nor selected in the GUI by the user, (2) a corresponding conversion rate associated with the anchor category, and (3) an initial user-defined icon that the user can select and change by interacting with the GUI;

extracting, by the server and from the database, historical transaction data corresponding to the user including: (a) transaction data records of the user, (b) merchant identifiers associated with the transaction data records of the user, and (c) category labels associated with the transaction data records of the user;

analyzing, by the server, the historical transaction data corresponding to the user;

identifying, by the server and based on the analyzing, a set of at least one of category labels and merchant identifiers that have been added to the transaction data records of the user at least a threshold number of times;

generating, by the server and based on the set, a customized list of selectable options, each of the selectable options corresponding to the set that was identified as satisfying the threshold number;

displaying the customized list of selectable options on the GUI;

determining that the user has performed a tap gesture on the display screen of the computing device, the tap gesture indicating a user selection of a category or a merchant from the selectable options displayed on the GUI;

updating, based on the user selection, the initial user-defined icon of the GUI to display loyalty point information corresponding to the user selection of the category or the merchant;

removing, from the customized list and based on the user selection, the category or the merchant that the user selected from the selectable options;

receiving, by the server and from the computing device, a signal including location data indicating a current geographic location of the computing device of the user;

engaging, by the server, an application programming interface to determine, based on the location data, that the current geographic location of the user is within a geofence representing a virtual boundary set up around a geographic location of a particular merchant;

determining, by the server and based on the historical location data stored in the database, that the user has visited the particular merchant a threshold number of visits within an interval of time;

responsive to determining that the current geographic location of the user is within the geofence of the particular merchant and that the user has visited the particular merchant the threshold number of visits within the interval of time, generating, by the server, a notification including offers of:
  (1) an acceptance option that the user can select, using the computing device, to accept a baseline conversion rate multiplier for the particular merchant or for a particular category associated with the particular merchant as identified by one of the category labels representing the particular category in the loyalty point management application;
  (2) a user-defined rate option that the user can select, using the computing device, to switch the baseline conversion rate multiplier to a new multiplier in exchange for a fee, the fee being proportional in value to a value of the new multiplier and applied to a financial account of the user, and the value of the new multiplier being greater than the baseline conversion rate multiplier, and p2 (3) a user-defined duration option that the user can select, using the computing device, to define a time period when the baseline conversion rate multiplier and the new multiplier are active for the user to earn loyalty points with the particular merchant or the particular category;

transmitting, by the server and to the computing device, a signal causing the computing device to display the notification within the GUI of the loyalty point management application, the notification offering the user, via the GUI: (1) the acceptance option to accept the baseline conversion rate multiplier, (2) the user-defined rate option to switch to the new multiplier in exchange for the fee, and (3) the user-defined duration option to define the time period when multipliers are active for earning loyalty points on future transactions involving the particular merchant or the particular category associated with the particular merchant;

receiving, by the server and from the computing device, a signal indicating the time period that the user selected as well as a selected multiplier that the user selected from the notification, the selected multiplier being either the baseline conversion rate multiplier or the new multiplier;

updating, by the server, conversion rate data records associated with the user to reflect the time period and the selected multiplier that the user accepted for the future transactions that occur during the time period and that involve the particular merchant or the particular category;

generating, by the server, a new user-defined icon including a value of the selected multiplier and a label indicating the particular merchant or the particular category that is associated with the selected multiplier;

transmitting, by the server and to the computing device, a signal causing the computing device to display a collection of loyalty point opportunities in the GUI for the user to redeem, the collection including the new user-defined icon, the loyalty point information of the initial user-defined icon, and the fixed icon indicating the anchor category; and crediting, by the server, an amount of loyalty points to the financial account of the user based on one or more of the transaction data records of the user indicating that user has completed a purchase transaction involving at least one of the particular merchant, the particular category, and the user selection of the category or the merchant.

9. The computer-implemented method of claim 8, further comprising:
  analyzing data records associated with an account of the user to identify one or more data records associated with the particular merchant;
  assigning a value to the one or more data records; and
  updating the financial account of the user based on the value assigned to the one or more data records.

10. The computer-implemented method of claim 8, further comprising:
  responsive to receiving the signal indicating selection of the acceptance option to accept the baseline conversion rate multiplier for the particular merchant or the particular category associated with the particular merchant, applying an input/output modifier to an account of the particular merchant.

11. The computer-implemented method of claim 8, wherein the notification includes a selectable tenant option to select the particular merchant as a tenant merchant for the particular category, and the method further comprises:
  receiving, by the server and from the computing device, a signal indicating selection of the selectable tenant option to select the particular merchant as a tenant merchant for the particular category;
  analyzing data records associated with an account of the user to identify one or more data records associated with the particular category;
  assigning a value to data records associated with the tenant merchant based on the baseline multiplier and assigning a value to data records associated with the particular category that are not associated with the tenant merchant based on a default multiplier; and updating the financial account of the user based on the value assigned to the one or more data records.

12. The computer-implemented method of claim 11, wherein the tenant merchant is an only merchant eligible for multipliers within the particular category.

13. The computer-implemented method of claim 8, wherein the customized set of selectable options includes one or more selectable options generated based on a demographic of the user.

14. The computer-implemented method of claim 8, wherein the customized set of selectable options includes a selectable option to display all options available.

15. A non-transitory computer readable storage medium comprising processor-executable instructions which, when executed, configure a processor of a server to:
   store, in a database, historical transaction data including: (a) transaction data records listing transactions made by customers at merchants as well as historical location data indicating geographic locations of the customers at the merchants, (b) merchant identifiers identifying the merchants in a loyalty point management application that have transacted with the customers, and (c) category labels representing one or more categories associated with each of the merchants;
   transmit, by the server and to a computing device of a user, a signal causing the computing device to display a graphical user interface (GUID) of the loyalty point management application on a display screen of the computing device, the loyalty point management application facilitating network communication between the server and the computing device of the user, the GUI displaying: (1) at least one fixed icon indicating an anchor category that can be neither changed nor selected in the GUI by the user, (2) a corresponding conversion rate associated with the anchor category, and (3) an initial user-defined icon that the user can select and change by interacting with the GUI;
   extract, by the server and from the database, historical transaction data corresponding to the user including: (a) transaction data records of the user, (b) merchant identifiers associated with the transaction data records of the user, and (c) category labels associated with the transaction data records of the user;
   analyze, by the server, the historical transaction data corresponding to the user;
   identify, by the server and based on the analyzing, a set of at least one of category labels and merchant identifiers that have been added to the transaction data records of the user at least a threshold number of times;
   generate, by the server and based on the set, a customized list of selectable options, each of the selectable options corresponding to the set that was identified as satisfying the threshold number;
   display the customized list of selectable options on the GUI;
   determine that the user has performed a tap gesture on the display screen of the computing device, the tap gesture indicating a user selection of a category or a merchant from the selectable options displayed on the GUI;
   update, based on the user selection, the initial user-defined icon of the GUI to display loyalty point information corresponding to the user selection of the category or the merchant;
   remove, from the customized list and based on the user selection, the category or the merchant that the user selected from the selectable options;
   receive, by the server and from the computing device, a signal including location data indicating a current geographic location of the computing device of the user;
   engage, by the server, an application programming interface to determine, based on the location data, that the current geographic location of the user is within a geofence representing a virtual boundary set up around a geographic location of a particular merchant;
   determine, by the server and based on the historical location data stored in the database, that the user has visited the particular merchant a threshold number of visits within an interval of time;
   responsive to determining that the current geographic location of the user is within the geofence of the particular merchant and that the user has visited the particular merchant the threshold number of visits within the interval of time, generate, by the server, a notification including offers of:
      (1) an acceptance option that the user can select, using the computing device, to accept a baseline conversion rate multiplier for the particular merchant or for a particular category associated with the particular merchant as identified by one of the category labels representing the particular category in the loyalty point management application;
      (2) a user-defined rate option that the user can select, using the computing device, to switch the baseline conversion rate multiplier to a new multiplier in exchange for a fee, the fee being proportional in value to a value of the new multiplier and applied to a financial account of the user, and the value of the new multiplier being greater than the baseline conversion rate multiplier, and
      (3) a user-defined duration option that the user can select, using the computing device, to define a time period when the baseline conversion rate multiplier and the new multiplier are active for the user to earn loyalty points with the particular merchant or the particular category;
   transmit, by the server and to the computing device, a signal causing the computing device to display the notification within the GUI of the loyalty point management application, the notification offering the user, via the GUI: (1) the acceptance option to accept the baseline conversion rate multiplier, (2) the user-defined rate option to switch to the new multiplier in exchange for the fee, and (3) the user-defined duration option to define the time period when multipliers are active for earning loyalty points on future transactions involving the particular merchant or the particular category associated with the particular merchant;
   receive, by the server and from the computing device, a signal indicating the time period that the user selected as well as a selected multiplier that the user selected from the notification, the selected multiplier being either the baseline conversion rate multiplier or the new multiplier;
   update, by the server, conversion rate data records associated with the user to reflect the time period and the selected multiplier that the user accepted for the future transactions that occur during the time period and that involve the particular merchant or the particular category;
   generate, by the server, a new user-defined icon including a value of the selected multiplier and a label indicating the particular merchant or the particular category that is associated with the selected multiplier;

transmit, by the server and to the computing device, a signal causing the computing device to display a collection of loyalty point opportunities in the GUI for the user to redeem, the collection including the new user-defined icon, the loyalty point information of the initial user-defined icon, and the fixed icon indicating the anchor category; and credit, by the server, an amount of loyalty points to the financial account of the user based on one or more of the transaction data records of the user indicating that user has completed a purchase transaction involving at least one of the particular merchant, the particular category, and the user selection of the category or the merchant.

16. The non-transitory computer readable storage medium of claim 15, wherein the processor-executable instructions, when executed by the processor, further configure the processor to:

analyze data records associated with an account of the user to identify one or more data records associated with the particular merchant;

assign a value to the one or more data records; and update the financial account of the user based on the value assigned to the one or more data records.

17. The non-transitory computer readable storage medium of claim 15, wherein the processor-executable instructions, when executed by the processor, further configure the processor to:

responsive to receiving the signal indicating selection of the acceptance option to accept the baseline conversion rate multiplier for the particular merchant or the particular category associated with the particular merchant, apply an input/output modifier to an account of the particular merchant.

18. The non-transitory computer readable storage medium of claim 15, wherein the notification includes a selectable tenant option to select the particular merchant as a tenant merchant for the particular category, and the processor-executable instructions, when executed by the processor, further configure the processor to:

receive, by the server and from the computing device, a signal indicating selection of the selectable tenant option to select the particular merchant as a tenant merchant for the particular category;

analyze data records associated with an account of the user to identify one or more data records associated with the particular category;

assign a value to data records associated with the tenant merchant based on the baseline multiplier and assign a value to data records associated with the particular category that are not associated with the tenant merchant based on a default multiplier; and update the financial account of the user based on the value assigned to the one or more data records.

19. The non-transitory computer readable storage medium of claim 18, wherein the tenant merchant is an only merchant eligible for multipliers within the particular category.

20. The non-transitory computer readable storage medium of claim 15, wherein the customized set of selectable options includes one or more selectable options generated based on a demographic of the user.

* * * * *